US005937192A

United States Patent [19]
Martin

[11] Patent Number: 5,937,192
[45] Date of Patent: Aug. 10, 1999

[54] COMPILATION OF COMPUTER PROGRAM FOR EXECUTION ON SINGLE COMPILING COMPUTER AND FOR EXECUTION ON MULTIPLE DISTRIBUTED COMPUTER SYSTEM

[75] Inventor: Paul A. Martin, Suffolk, United Kingdom

[73] Assignee: British Telecommunications public limited company, London, United Kingdom

[21] Appl. No.: 08/659,676

[22] Filed: Jun. 5, 1996

[30] Foreign Application Priority Data

Jan. 16, 1996 [GB] United Kingdom .................... 9600823

[51] Int. Cl.[6] ........................................................ G06F 9/45
[52] U.S. Cl. .................... 395/705; 395/707; 395/200.31; 395/200.47; 395/683; 707/10
[58] Field of Search ..................................... 395/705, 707, 395/704, 712, 500, 683, 682, 671, 200.31, 200.32, 200.33, 200.47, 701, 702; 705/14, 1; 707/10, 9, 103, 104; 370/270; 379/219, 220

[56] References Cited

U.S. PATENT DOCUMENTS

| | | | |
|---|---|---|---|
| 5,313,635 | 5/1994 | Ishizuka et al. ........................ | 395/705 |
| 5,361,360 | 11/1994 | Ishigami et al. ........................ | 395/712 |
| 5,495,610 | 2/1996 | Shing et al. ........................ | 395/200.51 |
| 5,555,427 | 9/1996 | Aoe et al. ........................ | 395/200.31 |
| 5,583,983 | 12/1996 | Schmitter ............................... | 395/705 |
| 5,590,331 | 12/1996 | Lewis et al. ............................. | 395/708 |
| 5,606,697 | 2/1997 | Ono .......................................... | 395/707 |
| 5,664,206 | 9/1997 | Murow et al. .............................. | 704/8 |
| 5,675,801 | 10/1997 | Lindsey .................................... | 395/702 |
| 5,675,804 | 10/1997 | Sidik et al. .............................. | 395/705 |
| 5,675,805 | 10/1997 | Boldo et al. ............................ | 395/706 |
| 5,684,955 | 11/1997 | Meyer et al. ........................... | 395/683 |
| 5,708,838 | 1/1998 | Robinson ........................... | 395/200.32 |

OTHER PUBLICATIONS

Martin, "Twenty Twenty Vision—Software Architectures for Intelligence into the 21st Century", BT Technol J., vol. 8, No. 3, Jul. 1990.

Cusack, "Object Oriented Technology", BT Technology Journal, vol. 11, No. 3, Jul. 1993.

Cusack et al, "Object Orientation in Communications Engineering", BT Technol J, vol. 11, No. 3, Jul. 1993, pp. 9–17.

Hutchinson et al, "Object–Oriented Languages, Systems and Applications", Chapter 9 Distributed Systems and Objects, Feb. 20, 1991.

Dennehy, T.G., "Class libraries as an alternative to language extensions for distributed programming," SEDMS III. Symposium on Experiences with Distributed and Multiprocessor Systems, USENIX Assoc. pp. 313–326, Mar. 1992.

*Primary Examiner*—Tariq R. Hafiz
*Assistant Examiner*—Tuan Q. Dam
*Attorney, Agent, or Firm*—Nixon & Vanderhye P.C.

[57] ABSTRACT

A pre-compiler program for operation with a conventional object oriented compiler program modifies the original source code to add new statements which amend the source code for re-compilation by the same compiler to produce executable code for execution on multiple processors.

21 Claims, 26 Drawing Sheets

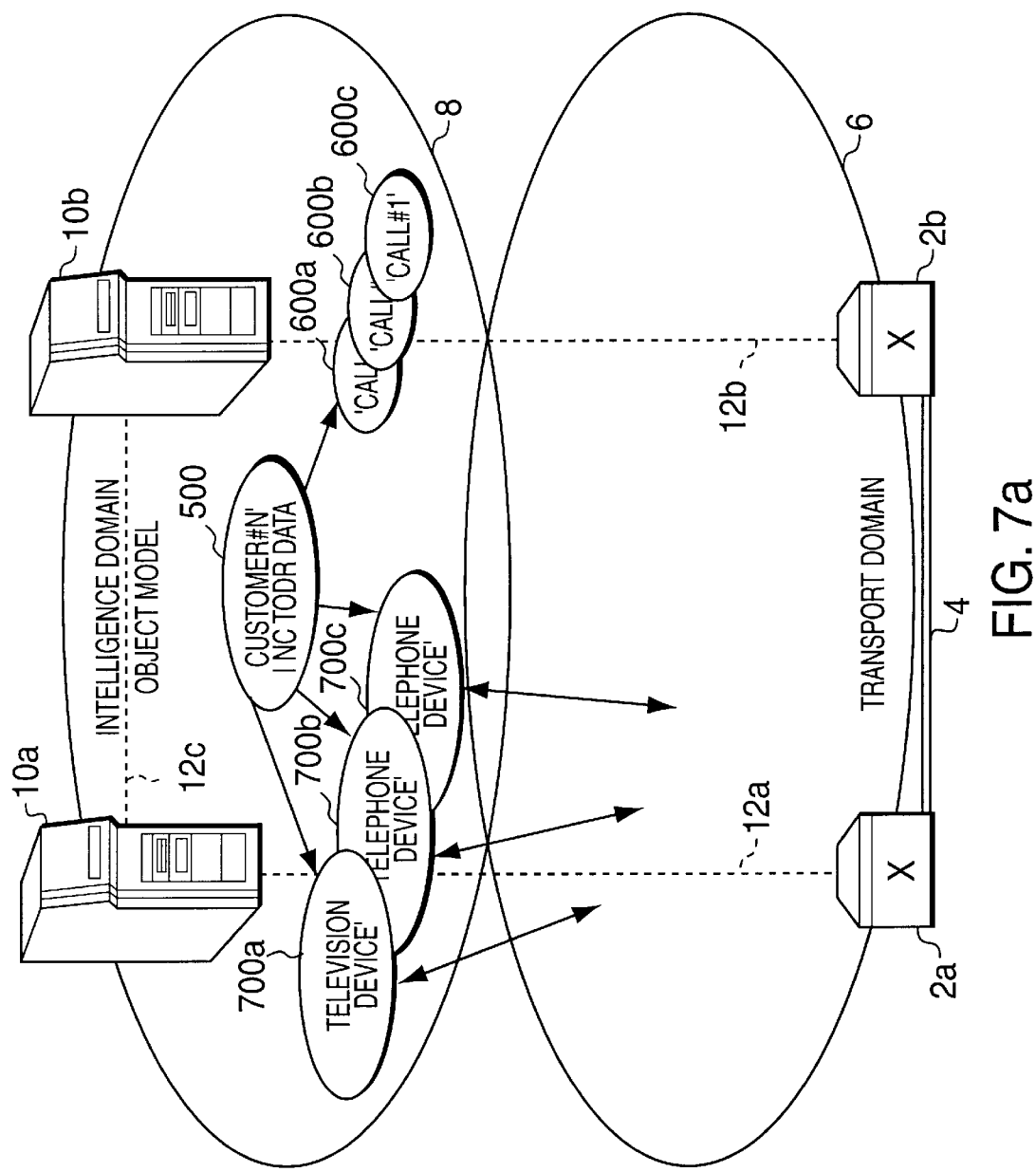

| | 112 500 | |
|---|---|---|
| 502 | CUSTOMER TYPE | "EMPLOYEE" |
| 504 | UID | 71 |
| 506 | HOST | "132.146.12.105" |
| 508 | NORMAL NO. | "0171-111-1111" |
| 510 | REROUTE NO. | "0171-222-2222" |
| 512 | REROUTE TIMES | 0700-2100 |
| 514 | CALL LOG | (NO.) (DATE) (TIME) (COST) |

FIG. 8

| OBJI | LOCATION | CONSTRUCTOR LOCATION |
|---|---|---|
| FSMITH | 1741-110-10 | 1712.017.02 |
|  |  |  |
|  |  |  |
|  |  |  |
|  |  |  |
| OBJ N | LOCATION | CONSTRUCTOR LOCATION |

FIG. 19

| HOST1 | FREE MEM | CONNECTIVITY | . . . . |
|---|---|---|---|
|  |  |  |  |
|  |  |  |  |
| HOST M |  |  |  |

FIG. 20

COMPILATION OF COMPUTER PROGRAM FOR EXECUTION ON SINGLE COMPILING COMPUTER AND FOR EXECUTION ON MULTIPLE DISTRIBUTED COMPUTER SYSTEM

BACKGROUND OF THE INVENTION

1. Field of the Invention

This invention relates to distributed processing, particularly but not exclusively distributed processing for control of a telecommunications network. More particularly, this invention is concerned with developing and updating the control systems implemented on the distributed processors, which are preferably (but not necessarily) processes implemented in an object-oriented fashion.

2. Related Art

Telecommunications networks are increasingly required to support high bandwidth, low delay information flow. The bandwidth required is rapidly progressing from kilobits per second to megabits per second and even, for some applications, gigabits per second (particularly, for example, for video on demand; animated shared simulations, and distributed computing).

To provide "intelligent network" facilities such as call redirection to particular numbers, computer programs run on a number of host computers (up to 100, for example) connected with switching centres. The way in which services are to be provided for particular customers (for example, a particular number to which calls for a customer are to be routed) depends upon data stored in relation to that customer on the host computers. Thus, there may be many millions of subscriber records on tens or hundreds of host computers.

In "Twenty-twenty vision—software architectures for intelligence in the 21st century", P. A. Martin, BT Technol J Vol 13 No. 2 April 1995, the present inventor has proposed the use of object-oriented techniques to implement the distributed processing required.

A description of object oriented technology will be found in, for example, BT Technol J Vol. 11 No. 3 (July 1993), "Object oriented technology", edited by E. L. Cusack and E. S. Cordingley. Although the term is not always used with precision, object oriented computing here refers to the computing technique in which data is stored in "encapsulated" form in which, rather than being directly accessible by a calling program or routine, the data is accessible only by a limited part of a program which can read, write and edit the data. A record of data and its associated computer code are referred to as an "object". Communication to and from an object is generally by "message passing"; that is, a call to the object passes data values and invokes the operation of one of the programs comprised within the object, which then returns data values.

Various languages are available for programmers who wish to use the objected oriented approach. Of these, the commonest at present is C++.

Distributed processing differs from single processor operation in several respects. Firstly, different access techniques may be required depending on whether other programs or data are located on the same host computer as a calling program or on a different host computer. The location of a program or data will also affect the speed with which it can be reached from another program. Also, one or more host computers may fail whilst leaving others in operation.

Distributed computing is conventionally performed, by using a "client-server" arrangement in which a "client" program on one computer interrogates a "server" program on another computer which then performs the function or returns the data required by the client program.

Object oriented techniques have not widely been applied to distributed processing. A summary of the state of the art in this respect may be found in "Object oriented programming systems"; Blair G., Pitman Publishing, London, 1991 (ISBN 0-273-03132-5) and particularly in Chapter 9 at pages 223–243; Object-Oriented Languages, Systems and Applications; David Hutchison and Jonathan Walpole. Previous attempts have generally added new syntax to an existing computer language, or have created new computer languages, to extend conventional object oriented programming to deal with distributed processing.

SUMMARY OF THE INVENTION

In one aspect, the present invention provides a compiler (or pre-compiler) for generating code for use in distributed processing on a plurality of host computers (for example for controlling telecommunications systems) which is arranged to receive a source program written in a computing language, and to amend the source program to adapt it from single processor execution to multiple processor execution.

Conveniently, this aspect of the invention comprises a pre-compiler which can then be used with a more conventional compiler, but it will be recognised that the functionality of the invention could be incorporated directly into a re-written compiler.

Thus, in this aspect, the invention conceals from the programmer the complexities of adapting the program to operate on many different processors, reducing the time required to produce an executable program.

Conveniently, the executable program produced by the invention is a single executable program which may be distributed to all processors of the distributed computing system in identical copies. This makes it easy to add new host processors to the distributed computing system.

In the present embodiments, the source program is in an object oriented language, and as preferably in C++. C++ provides additional problems in compilation for distributed environments, since it is intended for single processor compilation and different processes communicate via shared memory pointers, which cannot operate in a multi processor environment.

Preferably, the invention performs one or more the following steps:

location and replacement of local memory pointer with message transmission code;

location of function calls and addition of additional code to invoke the functions from received messages and to return function values via return messages; and addition of a type model comprising data representing the data and control structure types represented in the original source program.

In another aspect, the invention provides a distributed computing system in which a plurality of objects (i.e. data readable and writable by its own code) are distributed across different host computers of the distributed computing system, in which each host computer is provided with a location list specifying the computers on which all the objects of the systems are located.

Thus, no central control point is necessary, which would otherwise provide a bottleneck to processing. Furthermore, since the location list may be the same on all host computers, new host computers can relatively easily be added by simply copying the location list from an existing host computer.

Other aspects and embodiment of the invention are as described and claimed hereafter.

BRIEF DESCRIPTION OF THE DRAWINGS

Embodiments of the invention will now be illustrated, by way of example only, with reference to the accompanying drawings in which:

FIG. 7a is a diagram representing the structure of data held within the intelligence domain forming part of FIG. 1;

FIG. 8 illustrates the data structure within memory of one component of FIG. 7a;

FIG. 19 illustrates the structure of an object location table held within memory as part of the object manager program of the host computer of FIG. 3;

FIG. 20 illustrates the structure of a host status table stored within the memory of the host computer of FIG. 3 as part of the object manager thereof;

DETAILED DESCRIPTION OF EXEMPLARY EMBODIMENTS

Figure 1:
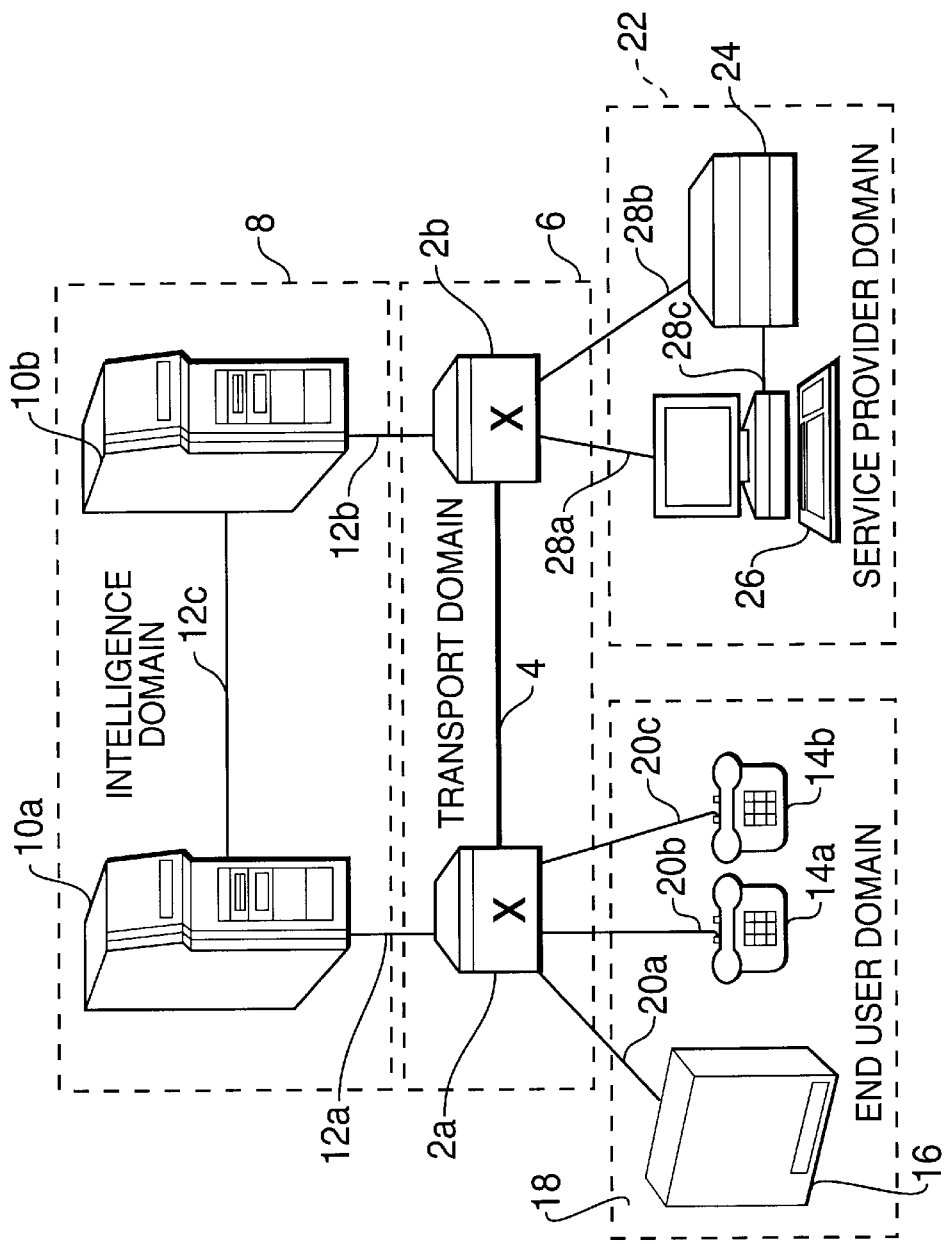
FIG. 1 is a block diagram illustrating the elements of a telecommunications systems embodying the invention.

Referring to FIG. 1, a telecommunications system produced according to the invention comprises a plurality of switching centres or exchanges 2a, 2b interconnected by communications channels 4 (e.g. microwave links, fibre-optic cables, coaxial copper cable or virtual circuits carried on any of the foregoing) making up a transport domain 6. Connected to the transport domain 6 is an intelligence domain 8 comprising a plurality of host computers 10a, 10b in signalling communication with the switch centres 2a, 2b via signalling links 12a, 12b, 12c which also interconnect the host computers 10a, 10b. For example, the two may be interconnected using protocols such as signalling system 7 (SS7).

End user apparatus such as telephones 14a, 14b and broad bandwidth communication devices such as video players 16, jointly comprise an end user domain 18 connected to the transport domain 6 via local loop connections 20a, 20b, 20c (for example optic fibre, cellular radio or twisted pair copper cable links).

Further provided is a service provider domain 22 consisting of equipment for providing services (for example video services), such as a video player 24 and a computer terminal 26, connected with the transport domain 6 via local loop connections 28a, 28b, 28c such as ISDN channels or other high bandwidth links.

In known fashion, an end user terminal 14 or 16 is used to pass a request, via the transport domain 6 to the service provider domain 22. As a result, a channel is set up through the transport domain 6 and the service provider domain 22 transmits a service via the channel to the end user domain 18 (for example by transmitting a real time video film, or a file of data in electronic format).

In conventional plain old telephone services (POTS), the transport domain 6 is controlled simply by the dialled numbers generated in the end user domain to set up the transport path. However, currently, "intelligent network" control of the transport domain is provided by the intelligence domain 8. The intelligence domain 8 receives from the transport domain 6 the dialled number and/or the dialling number, and performs some call processing in accordance with either the dialled or the dialling number, or both. The intelligence domain typically provides number translation services, where a dialled phone number is translated to provide a call forwarding service to another number. In this case, the dialled number corresponds to a stored record on one of the host computers 10, which is accessed in response to a signal on one of the links 12, to generate a corresponding redirection number.

In general, in response to the occurrence of an event in the transport domain 6 (such as the initiation of a call from the end user domain 18) the intelligence domain supplies control information to control the transport domain 6.

Other data is also stored within the intelligence domain. In this embodiment, billing data for each call is stored in the intelligence domain, to enable periodic billing of each customer.

Figure 2:
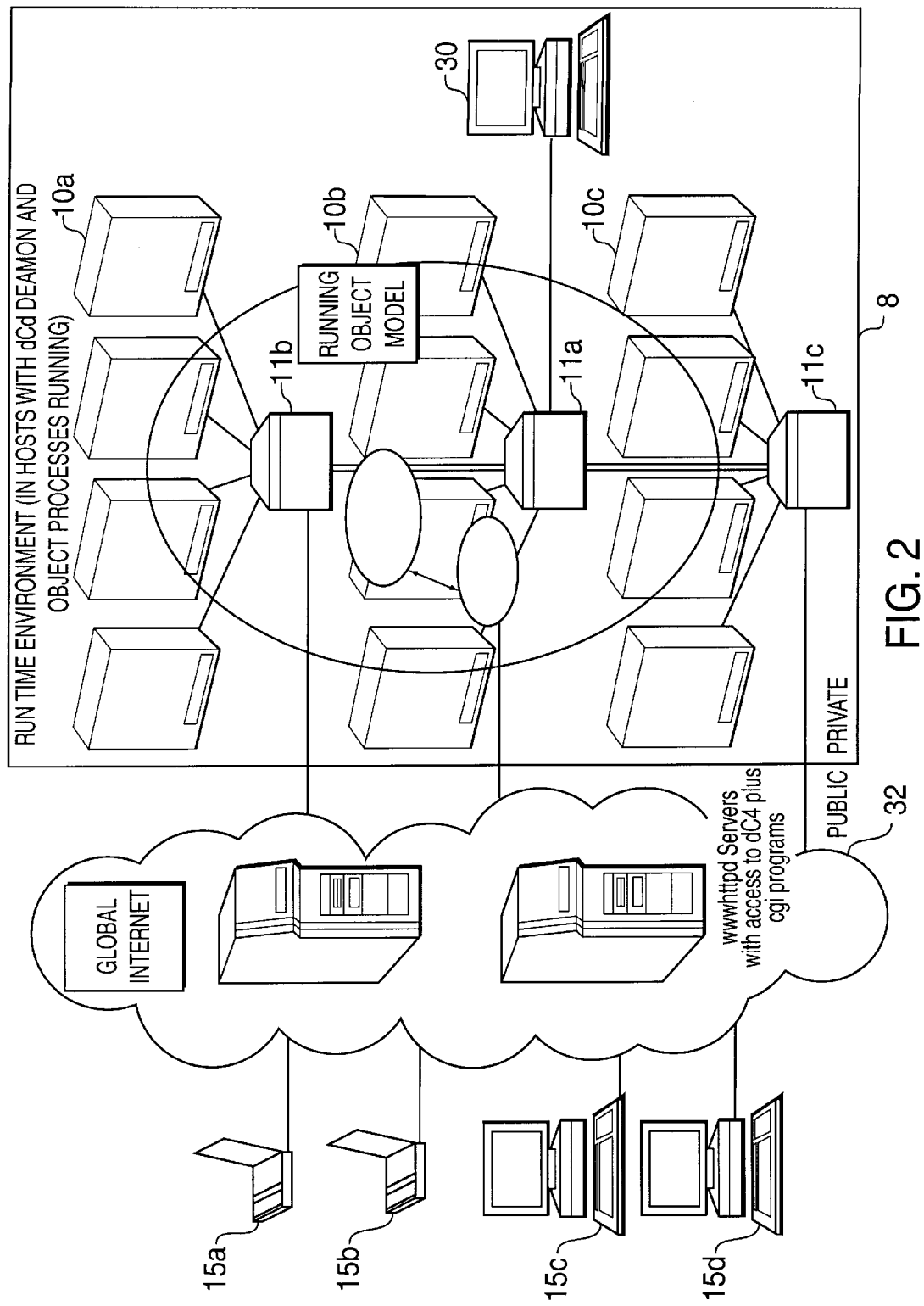
FIG. 2 is a block diagram illustrating further embodiments of the system of FIG. 1.

Referring to FIG. 2, the intelligence domain 8 further comprises a compiler apparatus 30, consisting of a programmed workstation, connected to the host computers 10 via network servers 11a–11c and a wide area network (WAN) running between the compiler apparatus 30, the hosts 10 and the servers 11.

The servers are also connected to one or more World Wide Web (WWW) server computers comprised within the Internet 32, and hence to editing terminals 15a–15d connected to the Internet (e.g. via a local packet switching node).

Figure 3:
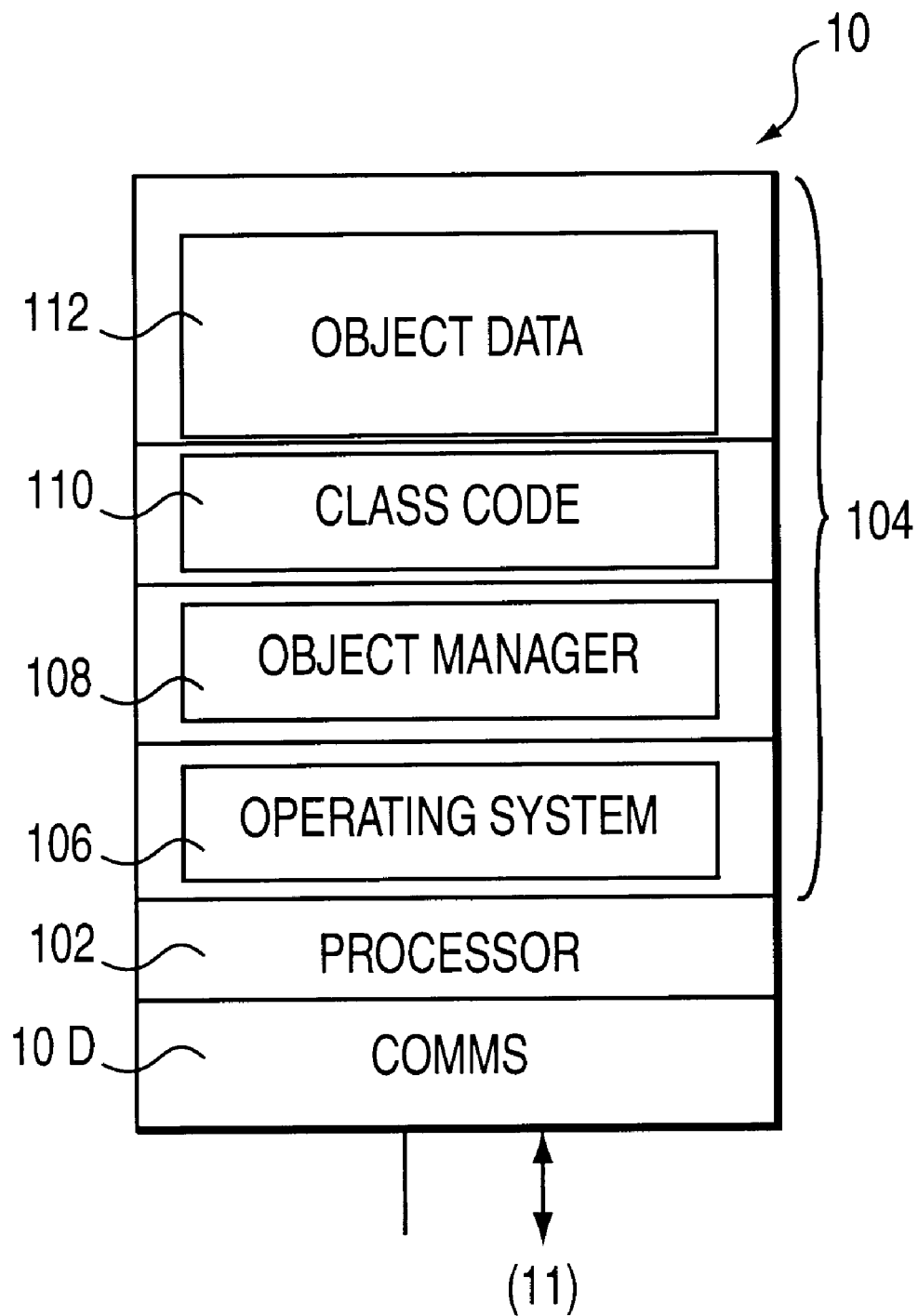
FIG. 3 is a block diagram illustrating the elements of a host computer forming part of the system of FIGS. 1 and 2.

Referring to FIG. 3, each host computer 10 comprises a mainframe or server comprising communications hardware 100 connected via the WAN to the servers 11; a processor 102; and storage 104, comprising both rapid access storage in the form of random access memory and offline storage in the form of magnetic or optical disc drives.

Stored within the storage apparatus 104 are an operating system 106 (e.g. UNIX (TM)); an object manager program 108; and an object model comprising class code 110 and object data 112, all of which will be discussed in greater detail below.

Each editing terminal 15 comprises a personal computer, and may be connected via modem to a common telephone socket with a corresponding telephone 14 at a user's premises.

Each editing terminal 15 therefore comprises a processor, a screen output device, an input device (e.g. keyboard and (or cursor control device such as a mouse), and storage apparatus ROM, RAM and a hard disc) containing a graphical user environment (e.g. Windows (TM)), a communications program and an object browser program.

Figure 4:
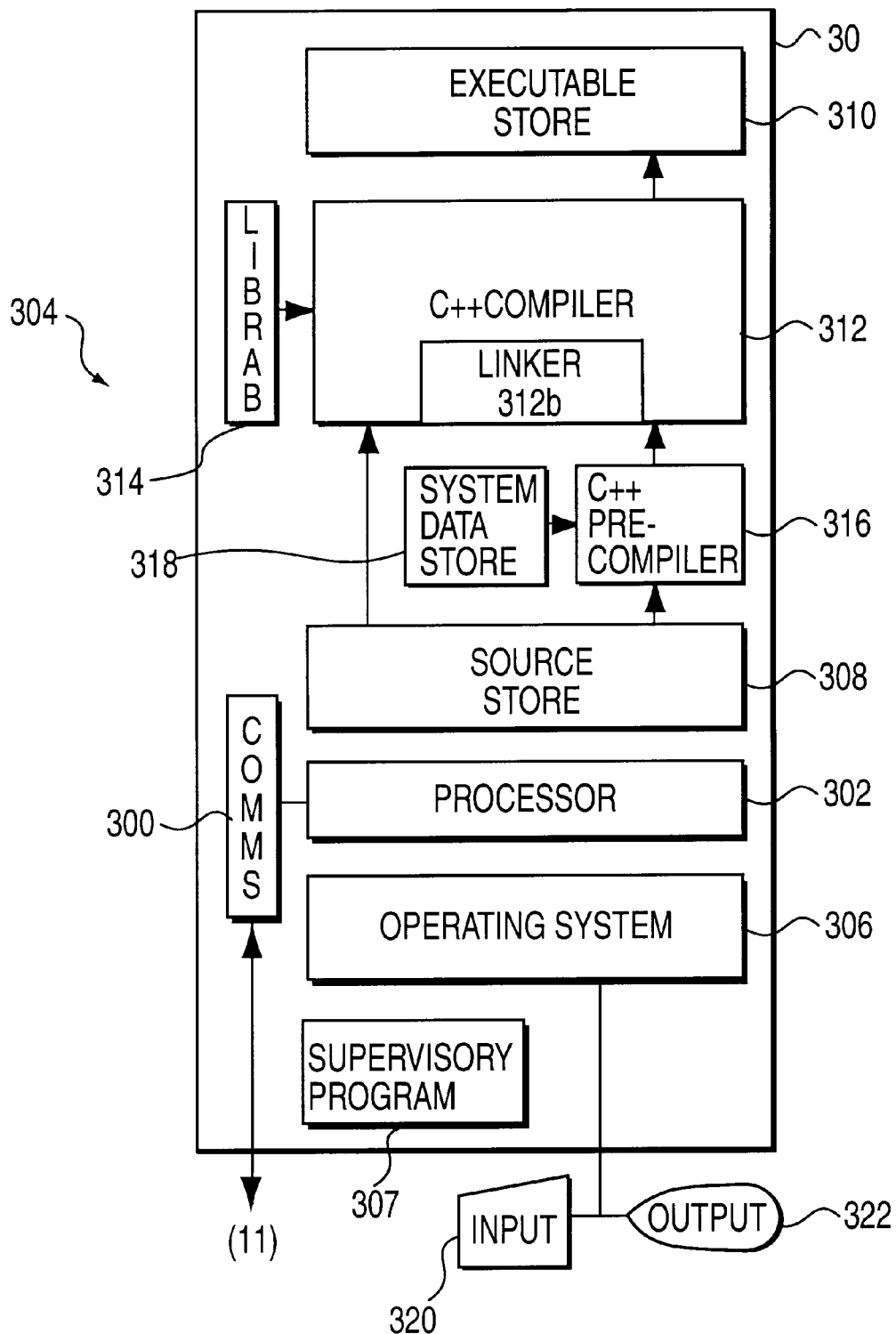
FIG. 4 is a block diagram illustrating the elements of a compiler apparatus forming part of the system of FIGS. 1 and 2.

Referring to FIG. 4, the compiler apparatus comprises a communications interface circuit board 300 connected to the WAN servers 11; a processor 302; and a storage apparatus 304 (not indicated separately) comprising rapid-access memory (RAM) and high capacity memory (e.g. a hard disc drive) and storing an operating system (e.g. UNIX (TM)), a C++ compiler program 312) (such as SunPRO available from Sun Microsystems); a pre-compiler 316 to be described in greater detail below; and a library 314 storing standard functions and definitions (specifying subprograms or subroutines) to be incorporated into new programs.

The C++ compiler comprises, as is conventional, a compiler which compiles to relocatable binary code and a linker program 312b which concatenates the binary code with the binary code routines stored in the library 314 and locates the concatenated code in a memory address space for execution.

Such compilers also generally include a pre-processor which interprets compiler directives, such as "include" statements to read in additional code, or perform other operations during compilations.

Also provided are: a storage area 308 for storing input source code defining a C++ program (e.g. input via the input device 320, or downloaded via the communications circuit 300, or loaded via a disc drive comprised within the storage apparatus 304); and a storage area 310 for storing executable code generated by the C++ computer 312 (i.e. by the processor 302 acting under control of the compiler program). Also included is a storage area 318 which stores system data concerning the number of distributed processors 10; the capacity of the available storage memory on each of the processors 10; the speed of operation of the processors 10 and so on.

The processor 302 is arranged to selectively run either the C++ compiler 312 on the source code in the source store 308, or the pre-compiler 316 followed by the C++ compiler 312 on the source code in the source store 308, to generate executable code in the executable code store 310.

In the former case, the code generated will execute on any suitable single processor. The processor 302 is, in the embodiment, itself arranged to be capable of executing the code directly generated in this manner by the C++ compiler, enabling the user to test immediately whether the program operates generally as expected.

In the latter case, the pre-compiler 316 first processes the source code in the source store 308 (taking into account any system data relating to the distributed system comprising the host 10 on which the code is to be executed), and generates amended source code in the source store 308 which is then compiled by the compiler 312 to generated executable code in the executable code store 310. This executable code is, however, not necessarily executable on the compiler apparatus 30 since it is for execution on the multiple distributed hosts 10.

Figure 5:
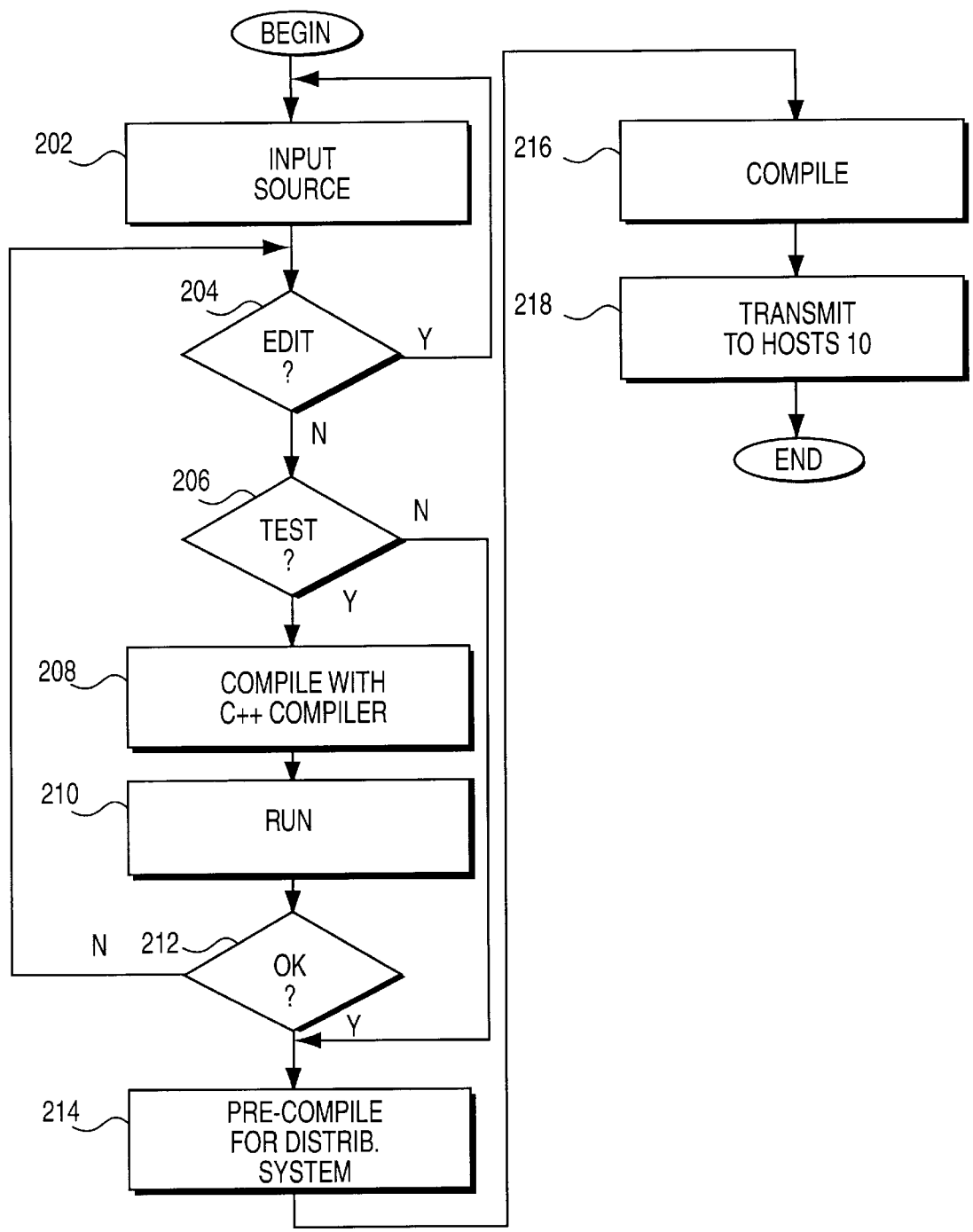
FIG. 5 is a flow diagram illustrating the operation of the compiler apparatus of FIG. 4.

Referring to FIG. 5, the general operation of the compiler 30 under control of the supervisory program 307 is as follows.

In a step 202, source code is input into the source code store 308 (e.g. via the input device 320). In a step 204, the human operator may decide to edit the source code in the source store 308, in which the edited text is input into the source store 308 (e.g. using a conventional text processor).

Once any such editing is complete, in a step 206, the user may elect whether or not to test the source code locally. In the event that he does so, in a step 208 the processor executes the C++ compiler 312 on the source code in the source code store 308 to produce executable code in the executable code store 310, and in a step 210 the processor 302 executes the executable code. A simulation program may be provided to intercept meaningless operations and substitute operations such as displaying on the output screen 322, to enable the user to see what is happening.

Figure 6:
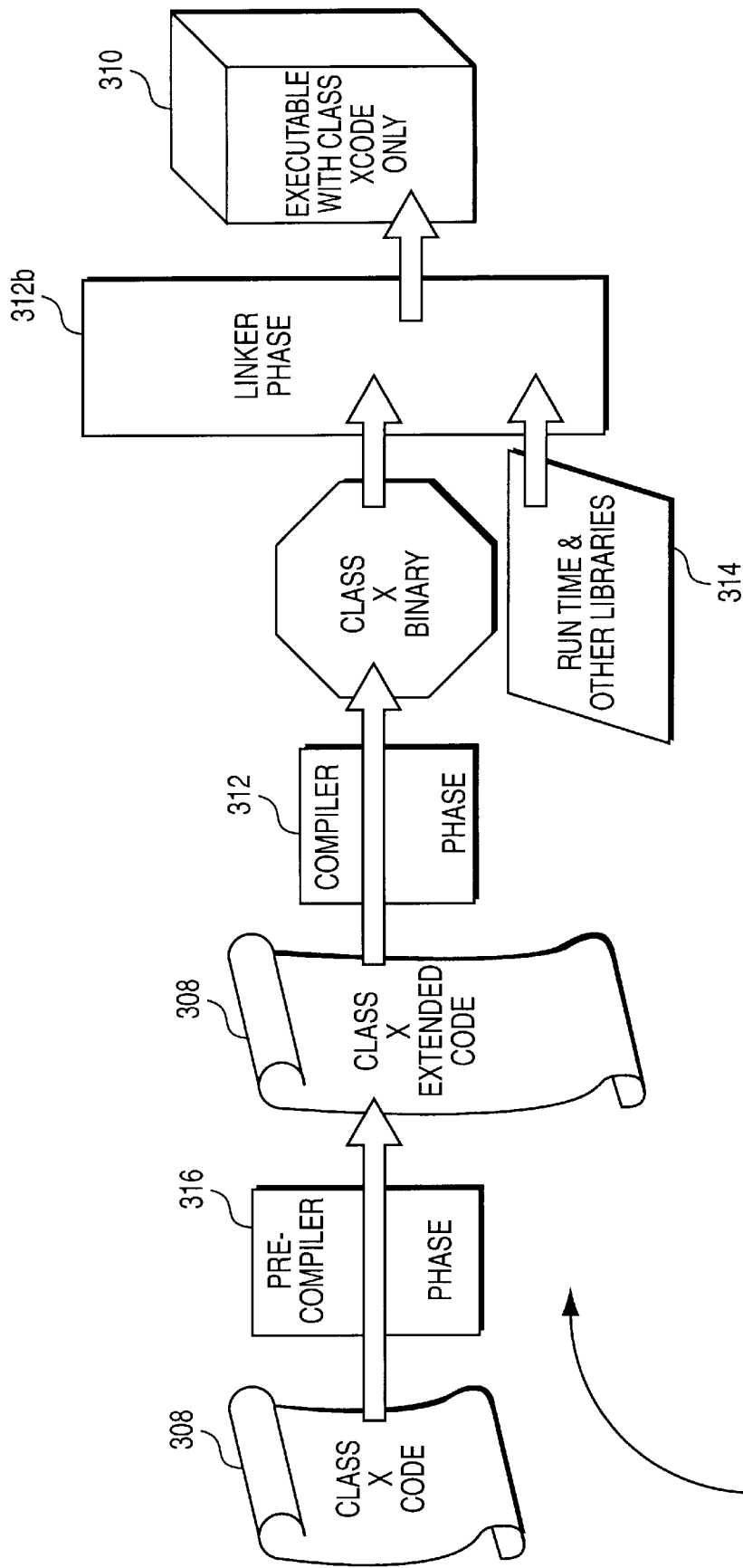
FIG. 6 is an illustrative drawing indicating the products of stages of processing performed in FIG. 5.

In the event that errors occur in the execution, in a step 212 the user may decide to return to step 204 to edit the source code in the source code store 308. If the source code appears satisfactory, then in a step 214, the pre-compiler 316 is applied to the source code in the source code store 308 to generate amended code, which is then compiled in a step 216 by the C++ compiler to generate executable code in the executable code store 310. This is then transmitted to the distributed host computers 10 in a step 218 via the WAN servers 11. This is illustrated graphically in FIG. 6.

The data model employed within the intelligence domain will now briefly be described. In the following, each "object" is a data record comprising a number of fields of data, which is accessed only by code which corresponds to that object (in a one to many relationship, in the sense that the same code which relates to a class of objects actually accesses all objects of that class).

As is conventional, objects are grouped into classes, the objects of the same class containing different data but in the same format. Each object is associated also with one or more subroutines (generally termed "methods" or "functions") which operate on the data, and which generally constitute the only means of doing so.

The formats in which the subroutines associated with different objects of the same class will receive and return corresponding data are the same (i.e. all objects of the same class have a common interface). In fact, in C++ the subroutines are only represented once for all objects of the same class (i.e. the code for the sub routines is only stored once) so that the code and the objects are in a one to many relationship. The code is therefore associated with the class of the objects rather than with each object.

Each class of object may be a subdivision of a more generic class, as is conventional in object oriented programming. In this case, the code may be stored instead in relation to the more generic class (the "superclass"). The object manager 108 contains a list of the locations of the data making up each object, and on each invocation of (i.e. call to), an object, the object manager accesses the relevant subroutine code within the class code storage area 110 and supplies to the code the address of the data for the relevant object within the object storage area 112.

Figure 7B:
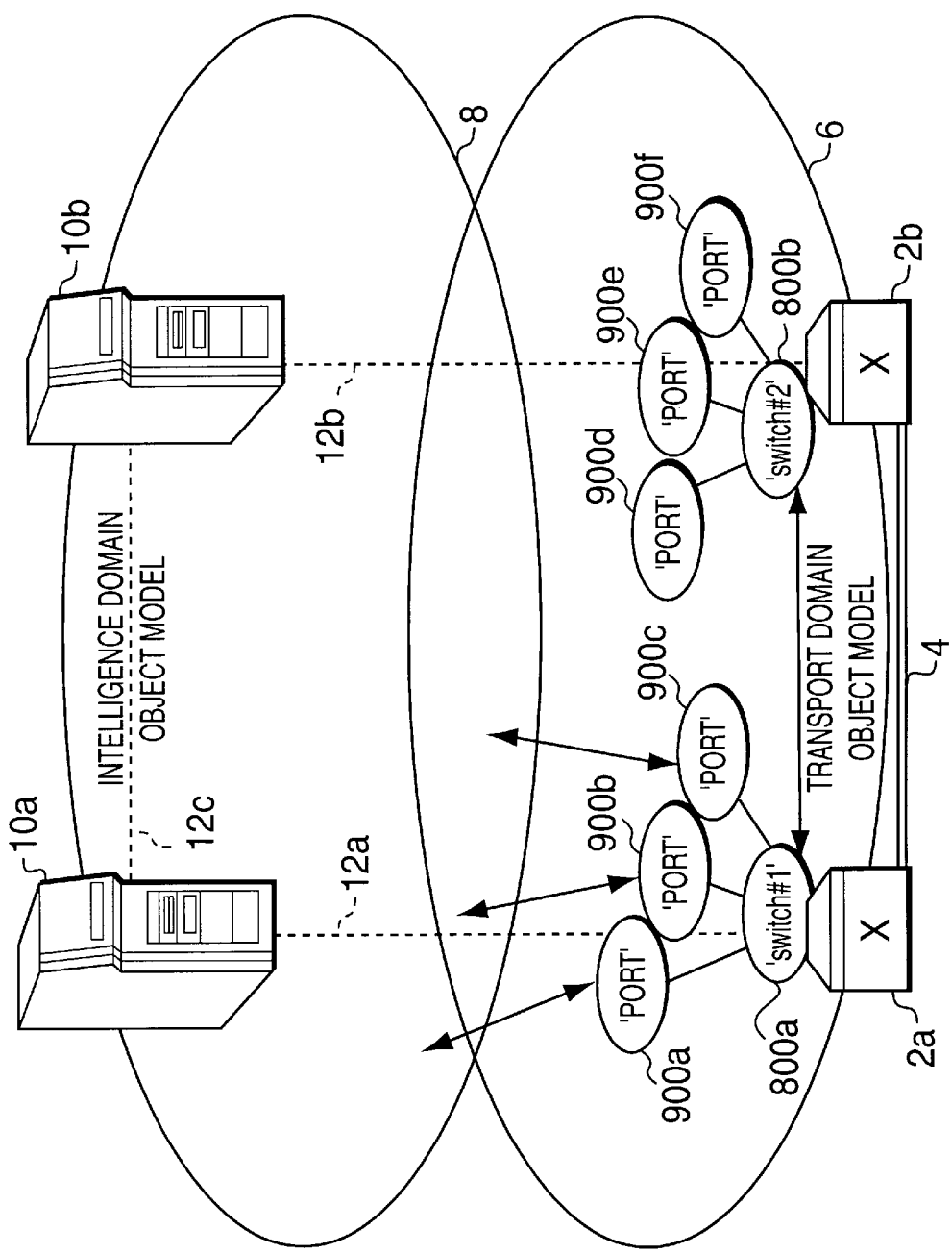
FIG. 7b is a diagram representing the structure of data held within the transport domain forming part of FIG. 1.

Referring to FIG. 7a and 7b, in this embodiment the objects provided within the hosts 10 of the intelligence domain comprise a plurality of customer objects 500 (one holding data relating to each of tens of millions of customers) which are created on the accession of a new customer; destroyed when the customer voluntarily departs or is cut off from the network; and edited when a customer's requirements change: a plurality of call objects 600a–600c which are created at the outset of call and destroyed after the termination of the call; and a plurality of communication device objects 700a–700c which each relate to an item of customer terminal equipment, and are created on first connection of that customer terminal equipment to the network.

Referring to FIG. 7b, in this embodiment the switching centres 2a, 2b . . . of the transport domain 6 further comprise host computers on which are stored objects 800a–800b, 900a–900f which represent, respectively, the switches and the ports of the switches within the switching centres. Thus, each switch object 800 contains a record of the state of the corresponding switch at any moment; these objects exist permanently in memory and have a one to one mapping to the physical devices present in the switching centres 2, so that writing to the port or switch objects changes the state of the respective ports or switches, and reading the port or switch objects gives an accurate reflection of the actual condition of the corresponding physical devices.

By way of example, the structure of data within a customer object is illustrated in FIG. 8.

The attribute data maintained by the object 500 comprises a customer type field 502 (which may indicate that the customer is an employee or some other unusual status, or is a normal customer); a user ID field 504; a host field 506 indicating the host 10 on which the object 500 was created (conveniently in http/TCP/IP format).

Also stored is data relevant to the services provided to the customer; for example, the normal telephone number of the customer (field 508); a telephone number to which the customers calls are to be re-routed at particular times of day (field 510); and the times of day during which calls are to be re-routed (field 512).

Finally, billing information for the customer is stored, in the form of a call log field 514 storing, for each call, the called (and/or calling) telephone number, the date and time of the call, and the cost of the call (field 514).

Different parts of this information need to be accessed by different individuals. For example, the fields 508–512 which define the service to be offered to the customer may be edited by customer service personnel or by the customer himself via an end user terminal 15, whereas billing data (field 514) should be writable only by the billing and accounting personnel operating the network. Certainly, no customer should be able to re-write his billing records from an end user terminal 15.

In operation, the occurrence of events in the transport domain (such as the monitoring of an "off hook" condition within the end user domain) invokes the operation of the code associated with an object in the intelligence domain. For example, on a telephone going off hook in the end user domain, the code to create a new "call" object 600 is invoked. When the called number is detected, it is transmitted via the signalling links 12 to the intelligence domain 8; the customer object 500 of the calling party is activated to amend the billing record field thereof; and the customer object 500 of the called party is accessed to determine the number to which the call should be forwarded, which information is then transmitted to the switch objects 800 within the transport domain to set up the path over which the call will be carried.

During the passage of a call, the role of the intelligence domain is usually limited. On clearing down a call on detection of the on hook event, the billing function code associated with the customer object(s) 500 updates the billing data field, and the call object is deleted by the object manager 108.

Figure 9:
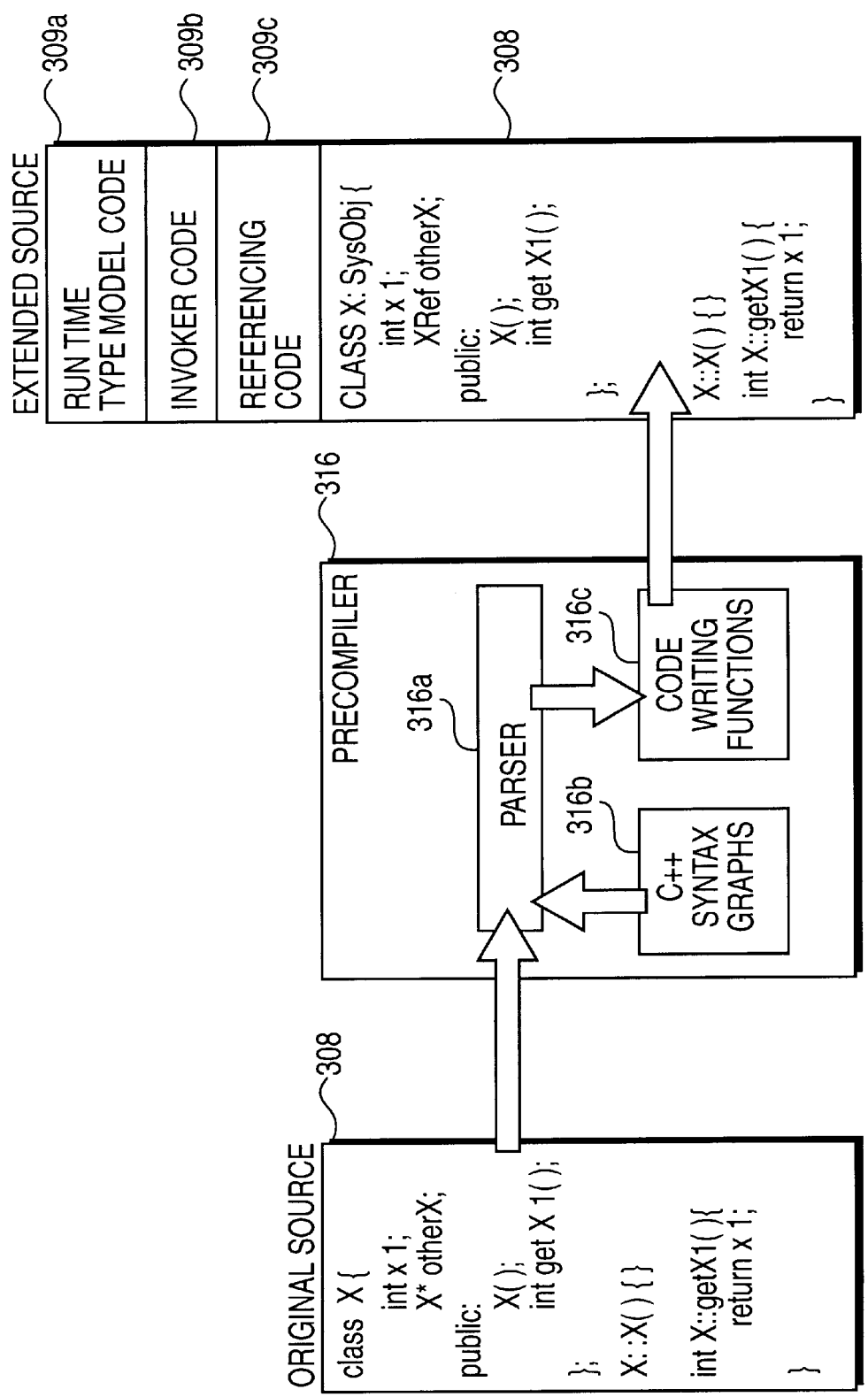
FIG. 9 illustrates the operation of the pre-compiler of FIG. 4 in augmenting original source code held in the source code store of FIG. 4 to produce extended source code.

Referring to FIG. 9, the pre-compiler 316 in this embodiment comprises a parser program 316a which examines successive C++ statements in the source code store 308 and refers to stored C++ syntax graphs 316b to determine which elements of each statement are functions, variables and so on; and a code writing program 316c which, on detection of predetermined syntax conditions by the parser 316a, creates corresponding additional source code which is added to the source code in the source code store 308.

Figure 10:
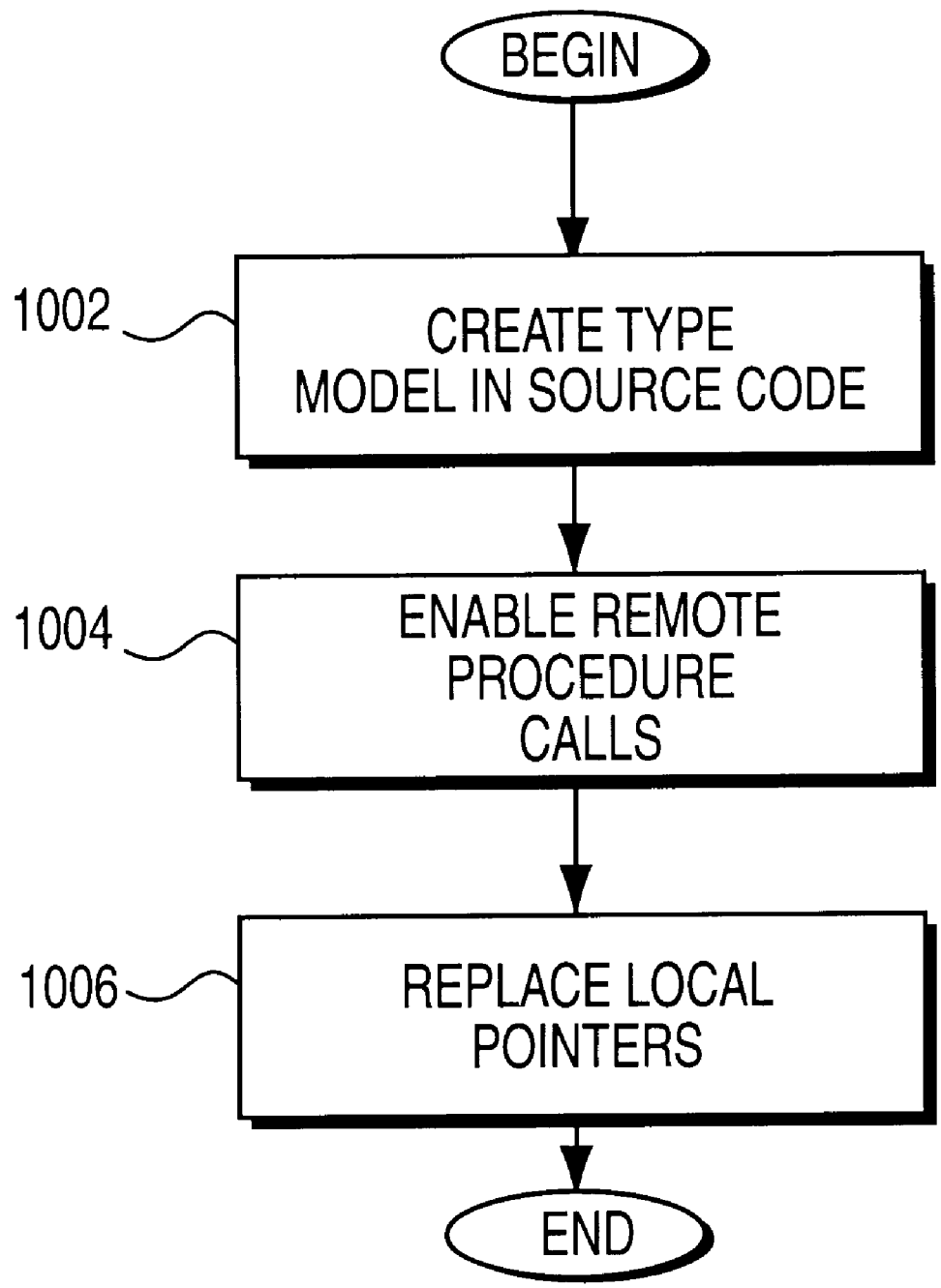
FIG. 10 is a flow diagram illustrating the general sequence of operations of the pre-compiler.
Figure 11A:
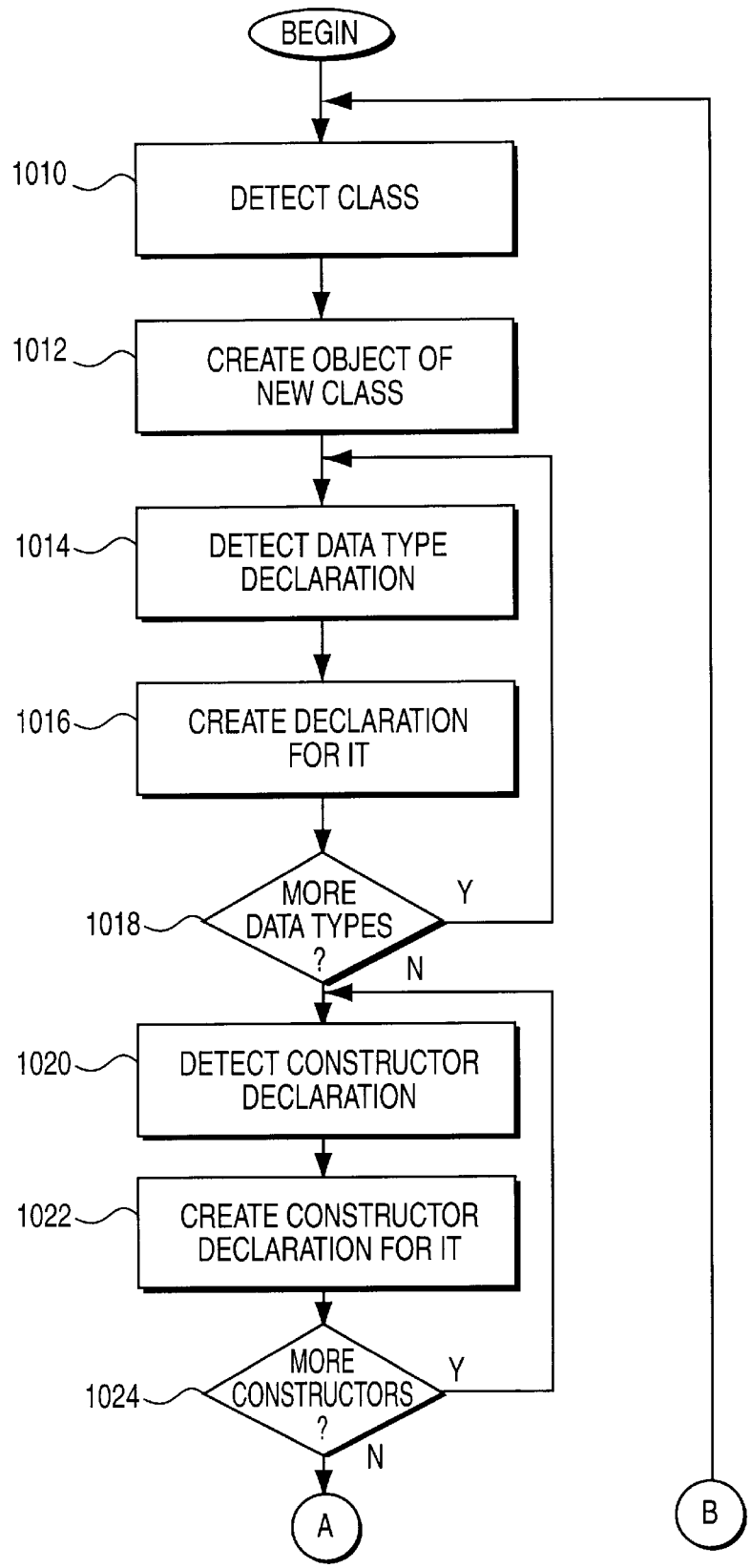
FIG. 11 (comprising FIGS. 11a and 11b) is a flow diagram showing in greater detail a part of the process of FIG. 10 for construction of a type model.
Figure 11B:
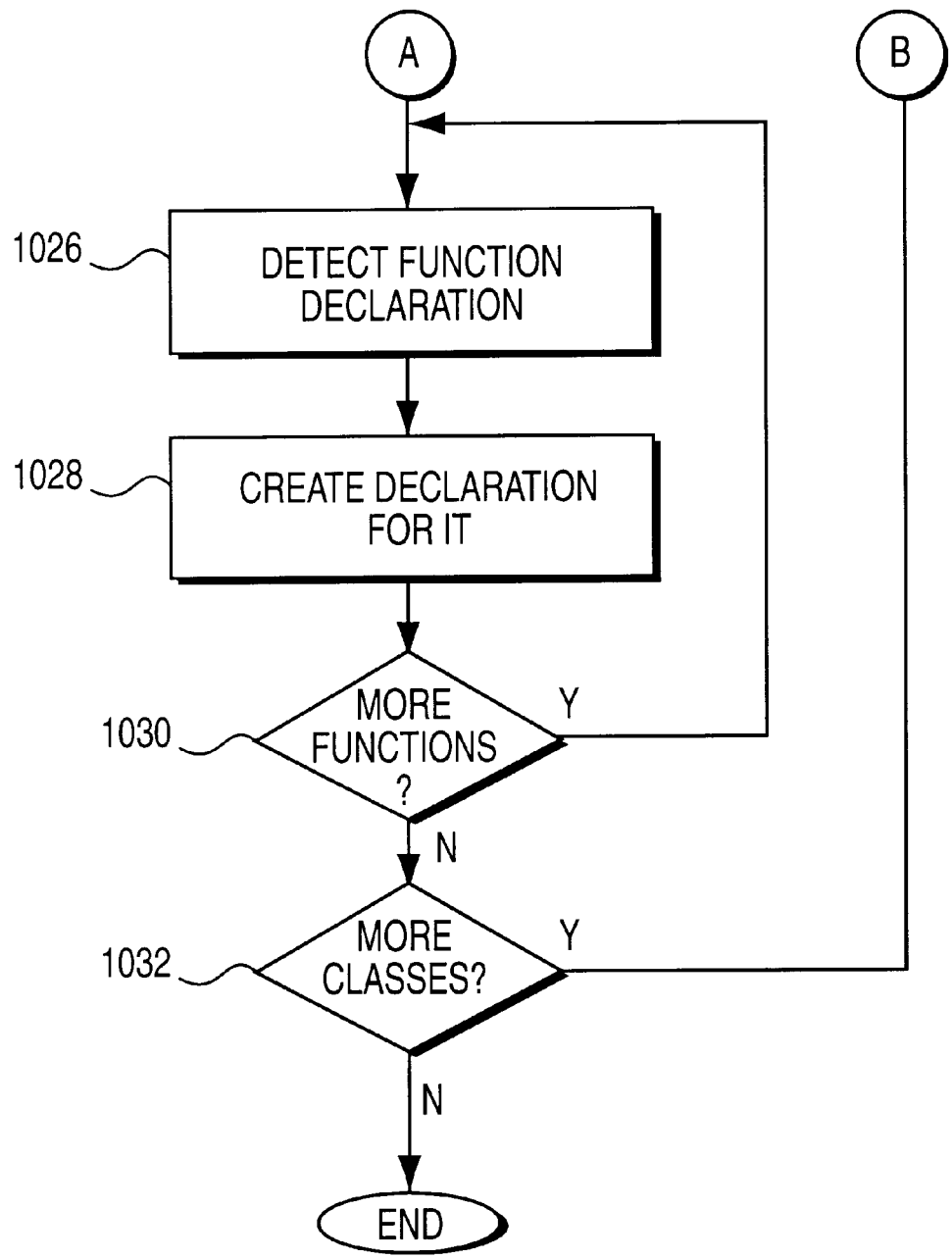

Referring to FIG. 10, the operation of the pre-compiler in general terms is as follows. In a step 1002 the processor 302 executing pre-compiler 316 creates an additional data structure ("type model") consisting of a new class comprising a set of objects which respectively represent all the classes of objects present in the source code of the source code store 308.

For each class encountered, therefore, a new object is created, which contains items of data recording the data held in, and the functions performed by, that class. This information is compiled together with the code so that at run time, each host processor 10 has information necessary to decide on which processor to open a new object of any given class, as will be discussed in greater detail below.

Thus, after step 1002, source code describing this type model 309a is written into the source code store 308.

In a step 1004, the pre-compiler 316 reads the source code in the source code store 308, and adds an invoker function which receives messages from other hosts 10 and, on receipt, calls corresponding local functions.

Thus, on each detection of a function (the "target function") in the source code in the source code store 308, the pre-compiler 316 inserts in the invoker function a statement which will call the target function on receipt of a message intended to call the target function from another processor. Code to correspondingly return a value from the target function as a message is also added.

Thus, after execution of step 1004, the source code in the source code store 308 includes the invoker code 309b for converting a received message from another processor to a local procedure call.

When compiled by the C++ compiler 312, any pointers used in the source code in the source code 308 will be allocated an address within a single, common, memory space, since the compiler 312 anticipates a single processor rather than a distributed computing environment. However, in a distributed computing environment, many objects may physically be located on different processors and accordingly cannot be accessed via pointers within a single memory space.

Accordingly, in step 1006, the pre-compiler 316 scans the source code in the store 308 and replaces each detected occurrence of a pointer with a reference which can be used to access the actual location of the object concerned, even if this is on a different processor. Thus, after operation of the step 1006, the source code in the source code store 308 includes also referencing code 309c.

The added code in each case consists of specific code statements on the one hand, and "#Include" statements on the other hand, which cause the compiler 312 to include library routines stored in the library 314.

Type Model Creation

Referring to FIGS. 11a to 13 the process performed by the processor 302 executing pre-compiler 316 in step 1002 will now be described in greater detail.

Figure 12:
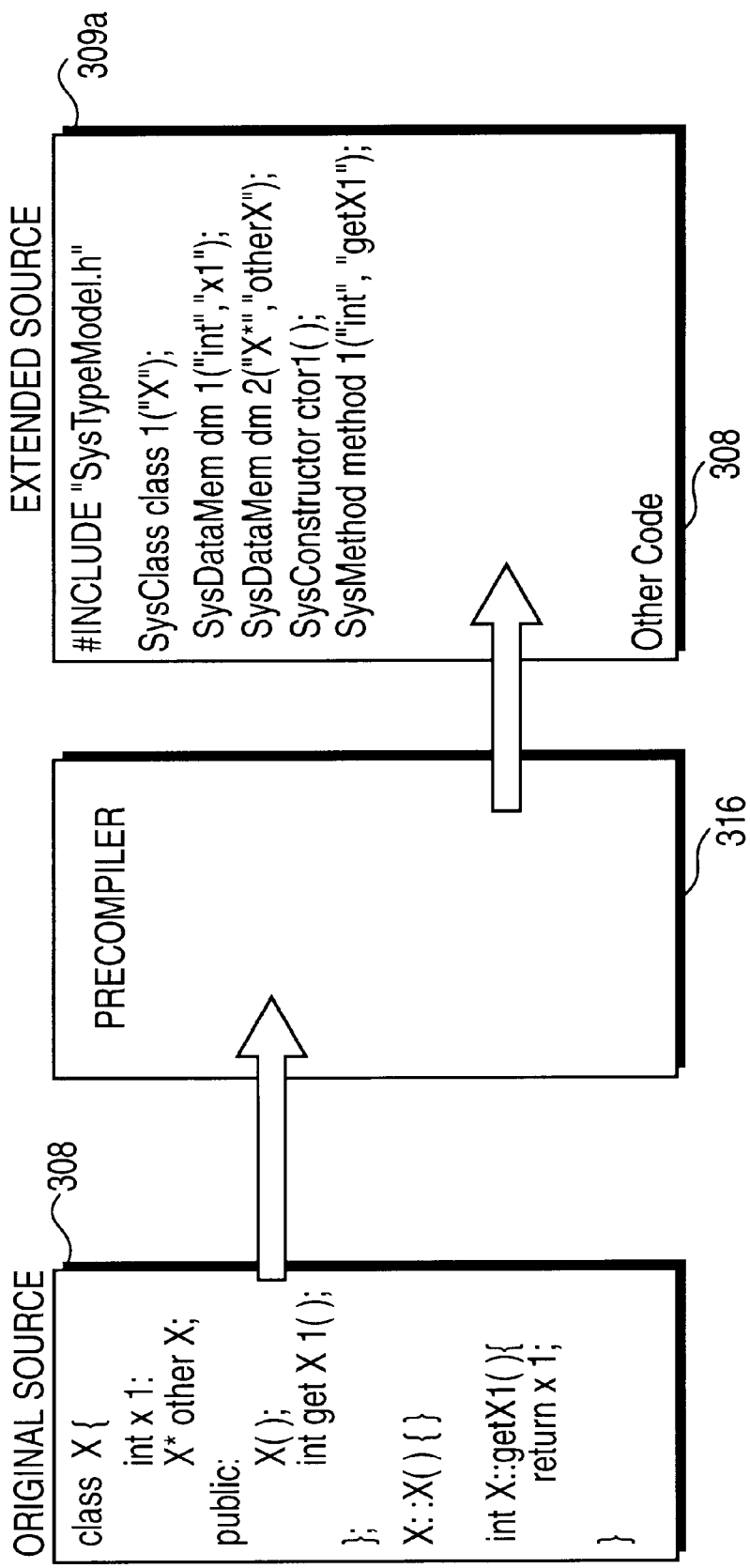
FIG. 12 illustrates the additional source code generated by that process.

The pre-compiler 316 scans the code stored in the source code store 308. On detection of a class declaration statement (step 1010) the pre-compiler 316 writes code to create ("instantiate") a new object of a new class, as shown in FIG. 12. In FIG. 12, the statement "#Include SysType Model.h" includes additional code which, amongst other things, declares a new class SysClass, and the statement "SySClass Class 1 ("X")" declares a new object Class 1 of that class, and stores the name ("X") of the Class which the object represents. Thus, in step 1012, this latter statement is written into the source code store 308.

Within the class declaration, when the pre-compiler 316 encounters a statement declaring a data type declaration (eg. the statement "INT X1" in FIG. 12) in step 1014, it writes (step 1016) a static data declaration storing the name and type of the variable as string data.

When all data declarations in the class have been scanned (step 1018), the pre-compiler 316 scans the code in the source code store 308 for the occurrence of constructor functions (ie. functions which, in run time, cause the creation of a new object of the class concerned).

On detecting a declaration of a constructor function (step 1020) the pre-compiler 316 writes a static declaration of the constructor function into the source code store 308 (step 1022).

After having scanned the or all constructor functions (step 1024) within the class declaration, the pre-compiler 316 detects (step 1026) occurrences of declarations of functions (ie. subroutines, programs or methods) in the class declaration in the source code store 308 and, on each occasion when a function is detected, writes (step 1028) a static declaration of a variable containing, as string data, the type and text of the function.

Figure 13:
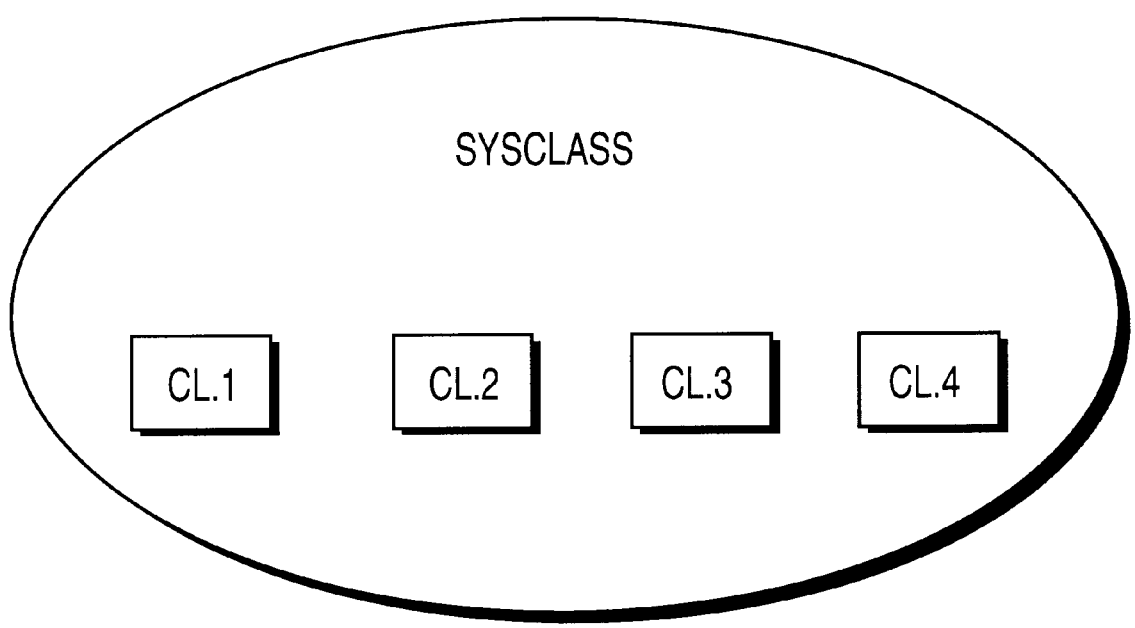
FIG. 13 schematically illustrates the structure of the type model thus produced.

Once all functions within the class have been detected (step 1030), the pre-compiler 316 proceeds in the same manner with the next class declared in the source code in the source code store 308 (step 1032) until the entire source program has been scanned in this manner. At that time, as shown in FIG. 13, within the new class SysClass, an object (CL1, C12, CL3, CL4 . . . ) for each declared class in the original source code will have been declared in the amended source code.

Invoker Creation

Figure 14:
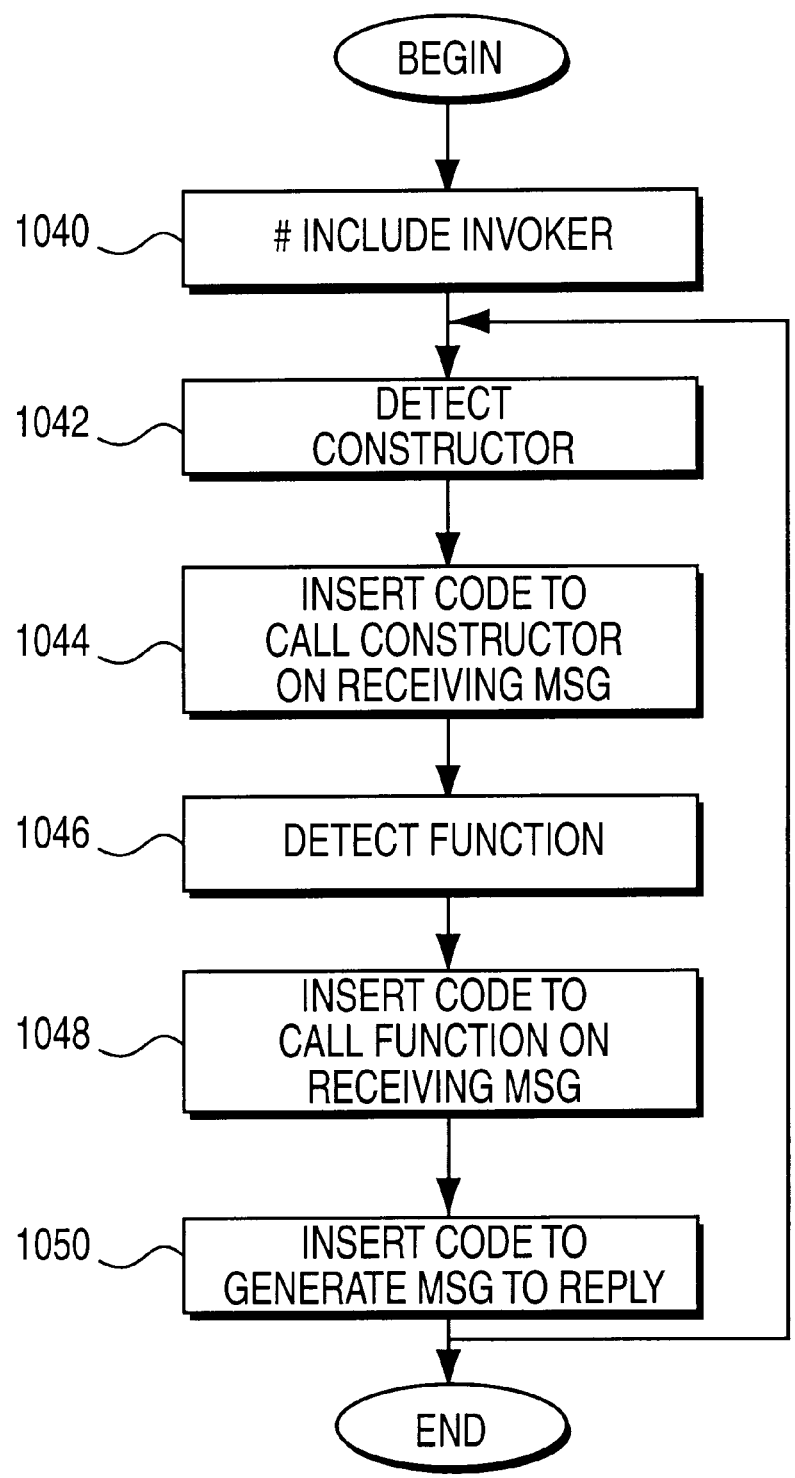
FIG. 14 is a flow diagram illustrating the steps of a further part of the process of FIG. 10 in providing for remote invocation of objects.
Figure 15:
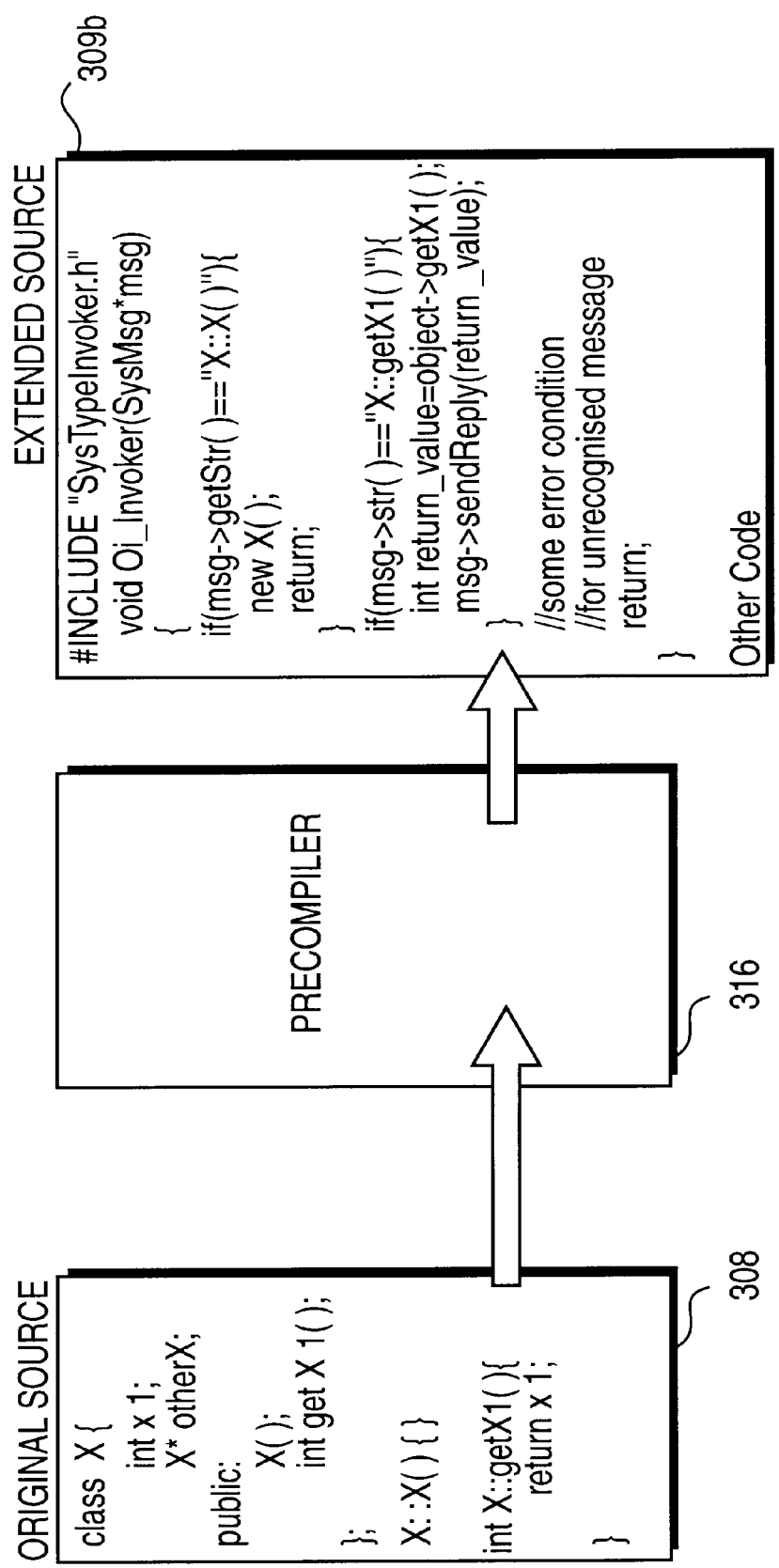
FIG. 15 corresponding indicates the additional source code produced thereby.

Referring to FIGS. 14 and 15, the operation of the pre-compiler 316 in performing step 1004 of FIG. 10 will now be described in greater detail.

First, in a step 1040, the pre-compiler 316 inserts a "#Include" statement to cause the compiler 312 to include code stored in the library 314 which performs a message receiving and despatching task. As will be discussed in greater detail below, a "message" in this context is passed from the operating system of the host processor 10 to the object manager thereof, and may originate from one of the other host processors 10 or from another process executing on the same host computer 10.

As well as including a reference to the library file containing the code for forming the message translation, the pre-compiler 316 also writes a declaration of an invoker function consisting of a number of specific procedures for executing a call to a function on arrival of a message intended to cause the execution thereof, and for returning any return values of the function via a return message.

In a step 1042, whilst once more scanning the source code in the source code store 308, the pre-compiler 316 detects the occurrence of a constructor function ("X::X()") and inserts (step 1044), within the definition of the invoker function, lines of code which compare a received message with text corresponding to a call to the invoker function and, where the message matches (ie. constitutes an attempt to execute a call to the constructor function), call the constructor function.

Likewise, on detection of a function of any other kind in step 1046 (for example, the function "getX1()" of FIG. 15), in a step 1048 the decompiler 102 inserts, within the invoker function, lines of code which compare a received message with text corresponding to a call to the function name, and where the message matches, call the named function, and (step 1050) generate a return message including the return value of the function thus called.

Thus, as shown in FIG. 15, after operation of the process of FIG. 14, the extended source code comprises a reference to an invoker function which is arranged to receive messages and to transmit messages in reply; and a series of specific subtests comprised within that function which detect the occurrence of calls to named local functions and perform those calls, and (where relevant) return a value.

Pointer Replacement

Figure 16:
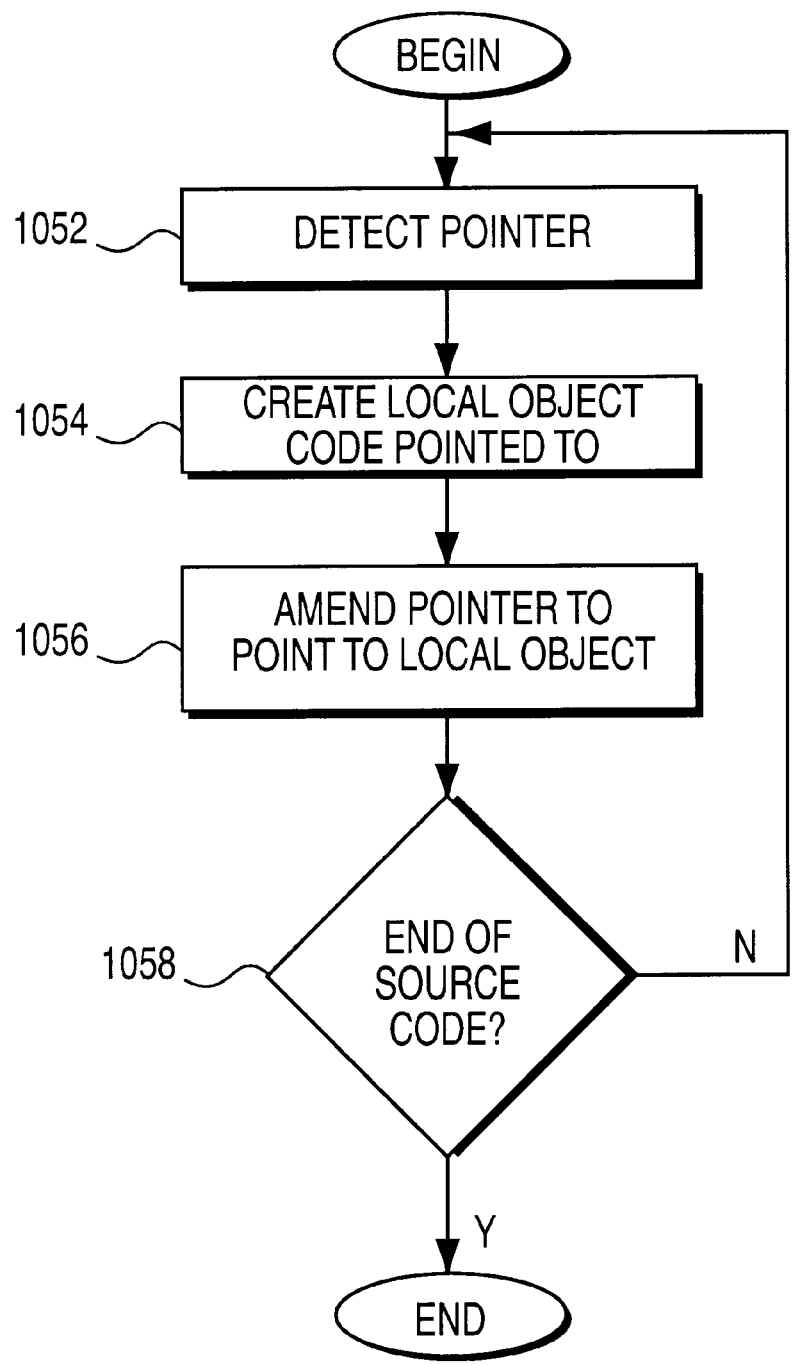
FIG. 16 is a flow diagram illustrating the steps of a yet further stage of the process of FIG. 10 to replace local pointers.
Figure 17:
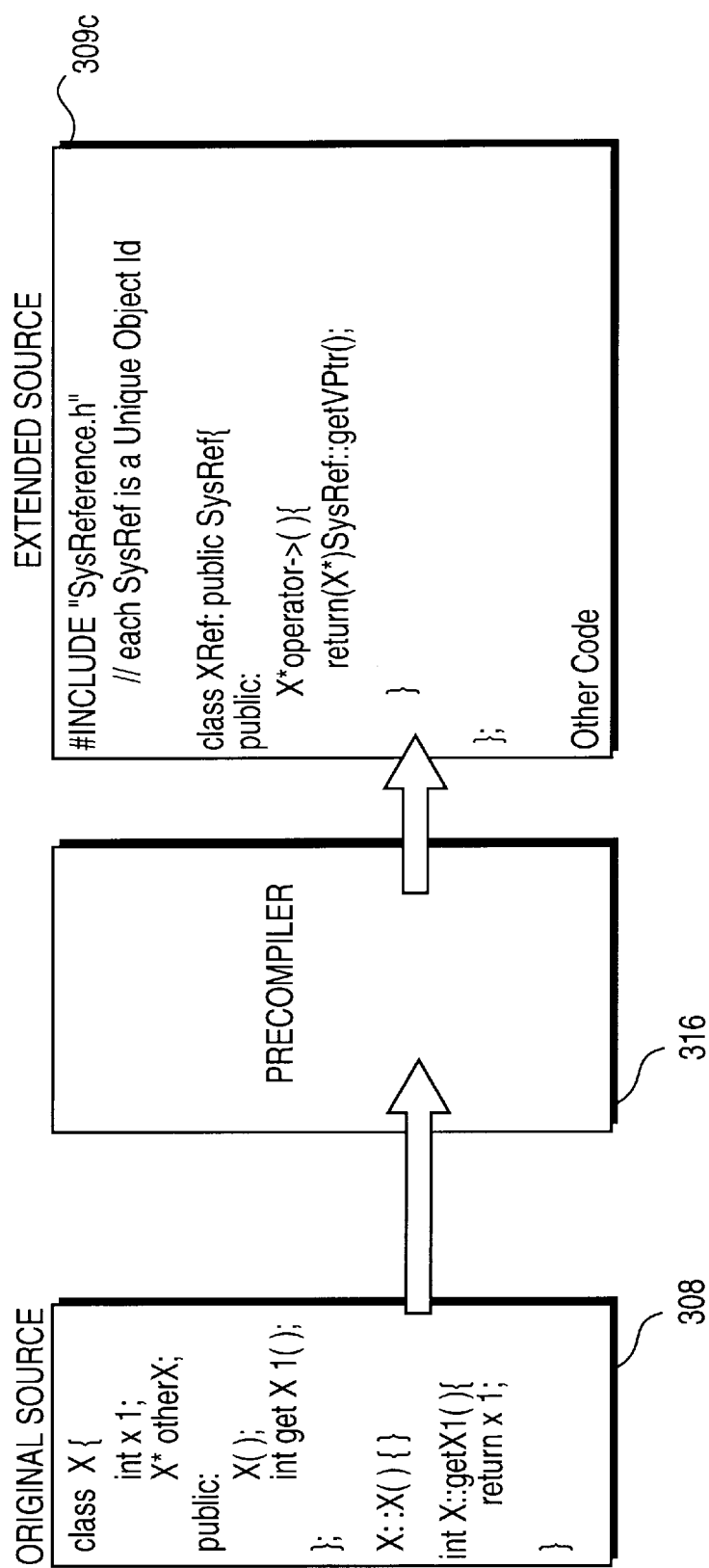
FIG. 17 illustrates the corresponding additional source code produced thereby.

Referring to FIGS. 16 and 17, the operation of the pre-compiler 316 in performing step 1006 of FIG. 10 will now be described in greater detail.

In a step 1052, the pre-compiler 316 scans the original source code in the source code store 308 to detect occurrence of declarations of pointers to other, named, objects (e.g., referring to FIG. 17, "X*otherX").

On detection of such a pointer to another object, the pre-compiler 316 inserts (step 1054) code to cause the creation of a new object (in the same address space as the object which contains the pointer, i.e. a "local", object). Referring to FIG. 17, in this case, the new object is named XRef.

Together with the constructor of the new object, code performed on a call to the object is created. Referring to FIG. 17, the code comprises statements which send a message comprising the pointer and associated operators, and return a value received in reply.

Then, in step 1056, the original pointer declaration in the original source code ("X*otherX") is amended to refer to the newly created local object ("XRefotherX") instead of the original object (otherX).

Figure 18A:
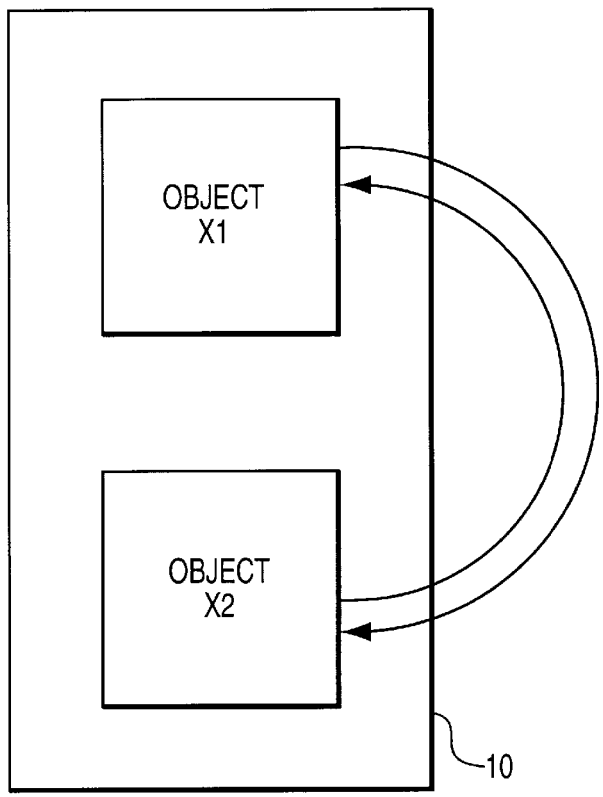
FIG. 18a is an illustrative diagram indicating calling a function via local pointers.
Figure 18B:
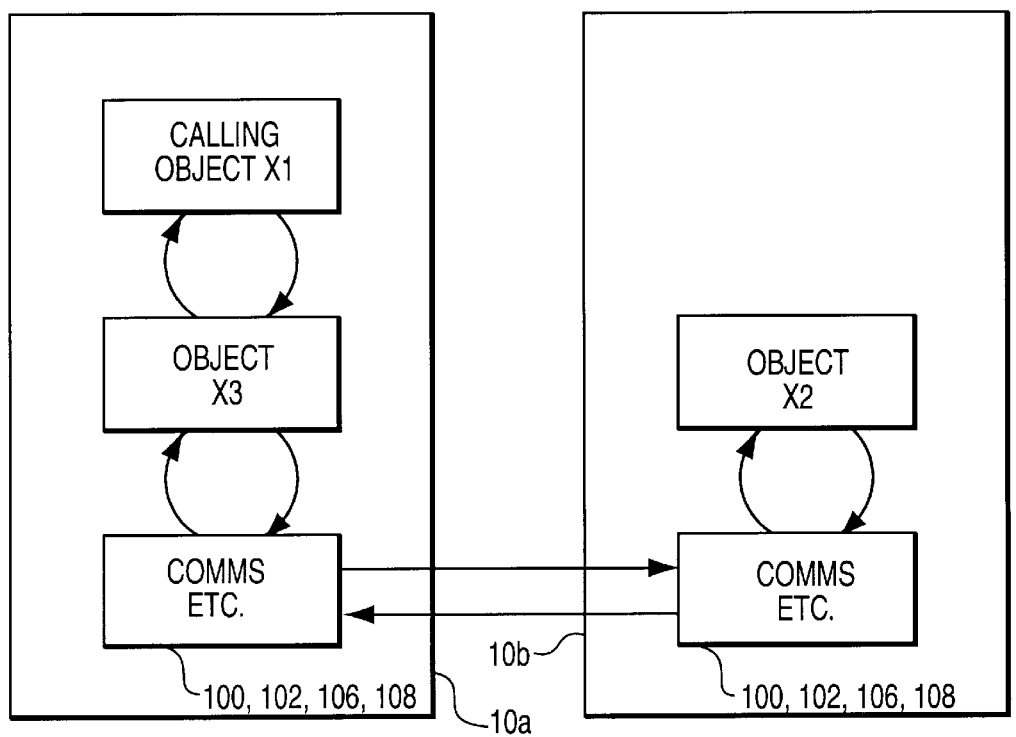
FIG. 18b is a corresponding illustrative diagram indicating the calling of a function by reference following the performance of the process of FIG. 16.

Thus, referring to FIGS. 18a and 18b, FIG. 18a shows the effect which would have been produced by compilation of the original source code of FIG. 17. An object X1 within the memory of a host processor 10 executes a call to an object X2 elsewhere within the memory of the host processor 10, which returns a reply value.

Referring to FIG. 18b, after operation of the process of FIG. 16, the calling object X1 is held in the memory of a first processor 10a and the object X2 is held in the memory of a second processor 10b. Accordingly, during compilation, a third object X3 is created in the same memory space as the calling object X1, and pointer references which would otherwise have referred to X2 now refer to X3. Such references are passed by the local "proxy" object X3 to lower level processes comprising the object manager 108, operating system 106, processor 102 and communications apparatus 100 of the first processor 10a, in the form of a message for transmission to the second processor 10b, as will be described in greater detail below.

The message is received by the communications apparatus 100, processor 102, operating system 106 and object manager 108 of the second host processor 10b, where (in accordance with the code inserted by FIG. 14 above) the message is converted into a local function call to the object X2, and the value returned by object X2 is transmitted back as a message to the host processor 10a. This return message is passed back to the local proxy object X3, and thence to the original calling object X1.

Thus, after all such pointers in the original source-code in the source code store 308 have been detected (step 1058), it will be understood that all local pointers which would otherwise have been generated by the compiler 312 have been converted into references to local proxy objects which in turn generate and receive messages to the originally referenced object.

The originally referenced object may, as shown in FIG. 18b, be physically located on a different host processor, or may be located on the original host processor 10; the use of message passing communications, rather than local pointers (as would normally be generated by C++ code) ensures that the object can be reached regardless of its location.

Runtime Operation

In the foregoing, the operation of the invention during precompilation has been described. The operation of the embodiment at runtime will now be described.

Within each host processor 10, the object manager program 108 (the "daemon") comprises, as will be described in greater detail, processes for creating new objects; processes for determining the location (i.e. the host computer 10) on which given objects are stored; processes for sending messages to remote host computers; and processes for receiving messages therefrom.

Referring to FIG. 19, the object manager 108 for each host computer 10 comprises an object location table 1500 storing a list 1510 of the objects currently in existence by name, and, associated with the record 1510a–1510z for each object, an entry 1520a–1520z storing the host computer 10 on which the object is currently stored, and an entry 1530a–1530z storing the identity of the host computer on which the object was initially created.

Referring to FIG. 20, also stored within the object manager 108 is a host table 1600 comprising status data on each of the host computers, from which the most suitable host computer to create a new object on can be derived. This table therefore comprises a first set of entries 1610a–1610z storing the identities of each host computer; an associated second set of entries 1620a–1620z storing the amount of free memory available on that host computer; a third associated set of entries 1630a–1630z storing connectivity data for each of the host computers 10 (for example the number of other computers to which it is connected), and optionally other entries relating to, for example, processor speed.

Figure 21A:
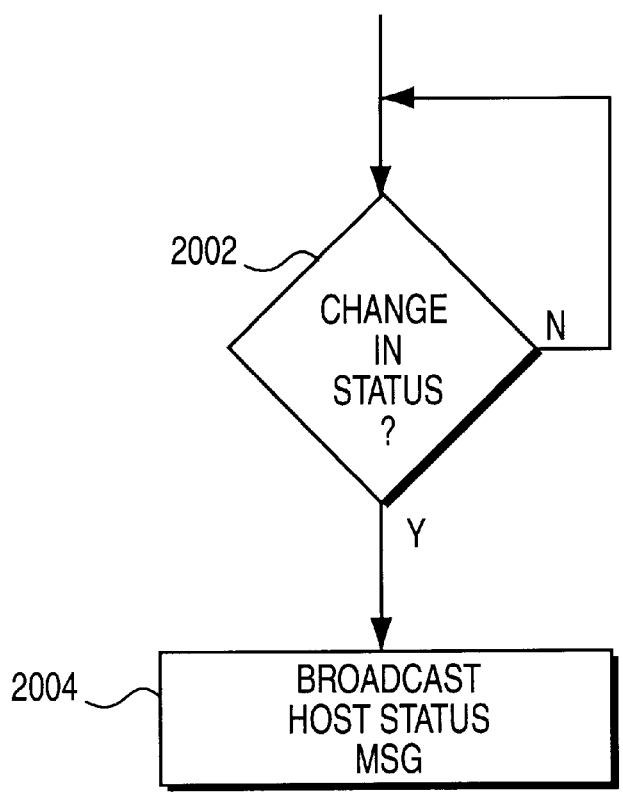
FIG. 21 (comprising FIGS. 21a and 21b) is a flow diagram illustrating the updating of the host status table.

Referring to FIG. 21a, the object manager 108 of each host computer 10 periodically interrogates the operating system 106 thereof to determine whether there has been any change in any of the data stored in the table 1600 for that processor (e.g. whether there is now less memory available than previously) in a step 2002 and, on detection of a significant change in any such item of information, in a step 2004 the object manager 108 causes the transmission of a broadcast message via the communications apparatus 100 to all other host computers 10 listed in the table 600, signalling the new information concerned.

Figure 21B:
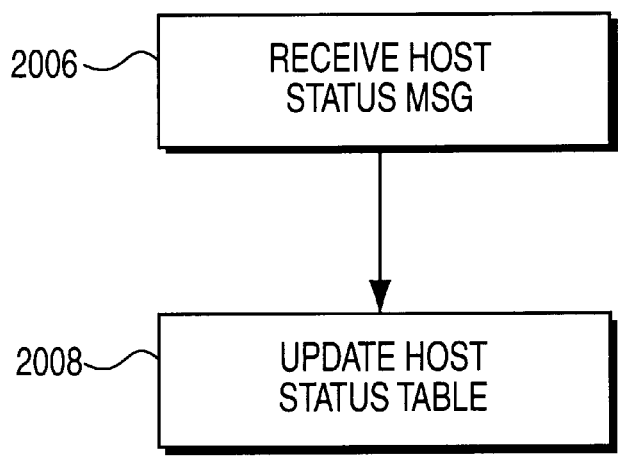

Referring to FIG. 21b, when any host computer 10 receives such a message in a step 2006, the object manager 108 thereof updates the status table 1600 of FIG. 20 to reflect the new information in a step 2008.

Thus, at any time, the object manager 108 of each host computer 10 maintains up to date status information for all other host computers, as well as its own, within the table 16 of FIG. 20.

Figure 22A:
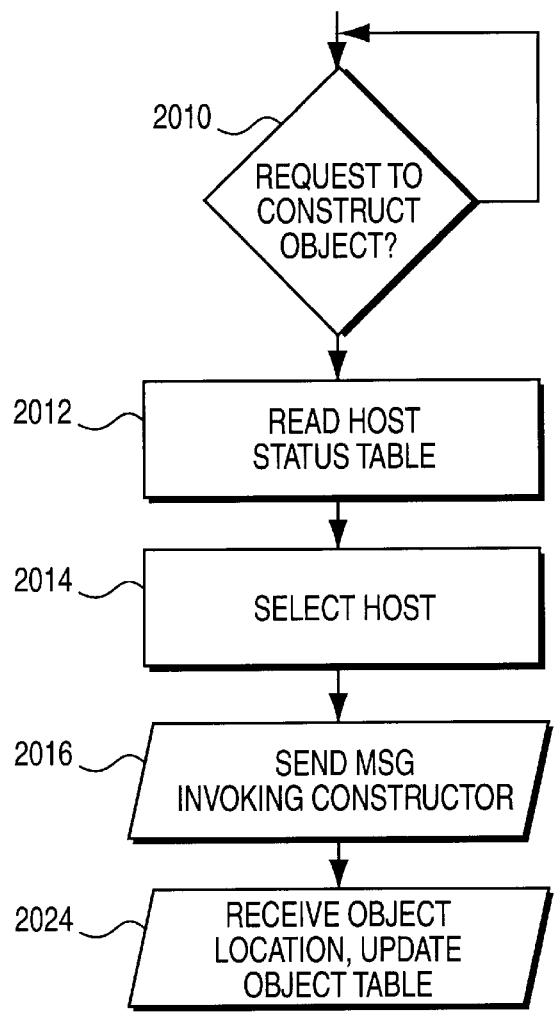
FIG. 22 (comprising FIGS. 22a and 22b) is a flow diagram illustrating the process of constructing a new object.
Figure 22B:
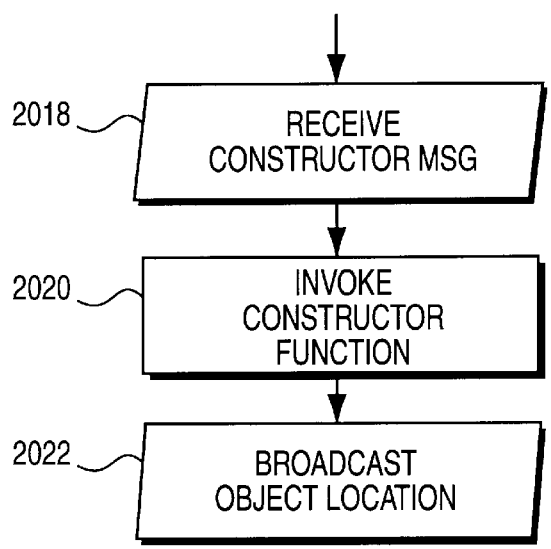

Referring to FIG. 22, the process undertaken on constructing a new object will now be described. In a step 2010, when an instruction to call an object constructor function would otherwise have been encountered in the source (step 2010), rather than creating the object in the address space of the host processor 10 from which the call to create the object originated, the object manager program 108 of the present embodiment reads the host processor status table 1600 in a step 2012 and the data stored in the object (created by the process described above in relation to FIGS. 11a to 13) which describes the class of which the object to be created will be a member.

Thus, the object manager program 108 is aware of the requirements of the object now to be created (i.e. whether it requires a large or a small amount of memory storage and whether it requires access to or from many communication points) and has data on the available capability of each host computer.

In step 2014, the object manager 108 selects a host computer 10 on which the object is to be created. The decision may be based solely on which host computer has the most available remaining memory, or on which has the best coactivity to access points from which the new object will be called, but is preferably a weighted function taking into account:

the available memory on each processor;

the connectivity of each processor; and a preference for the current processor (i.e. that from which the call to create the object originated).

In a step 2016, the object manager 108 transmits a message to the selected host computer 10 comprising the address of that host computer and the command to invoke the constructor function of the class to which the object to be created belongs, together with the name of the object to be created.

At the targeted host computer 10, in a step 2018, the message is received and passed to the invoker function (which was created as described above with reference to FIGS. 14 and 15 at compile time) in a step 2020. The invoker function then causes the creation of the new object at the targeted host computer. At the same time, the targeted host computer 10 on which the new object is created updates its object table 1500 to include the new object.

Finally, in step 2022, the targeted host computer broadcasts to all other host computers 10 the identity of the new object and its location, which is received at the originating host computer (amongst others) in a step 2024 and used to update the object table 1500 thereat. Thus, according to this embodiment, objects are created in runtime at selected host computers 10, so as to balance the distribution of objects to the most suitable host computers, on the basis of periodically updated information on each host computer status.

Figure 23:
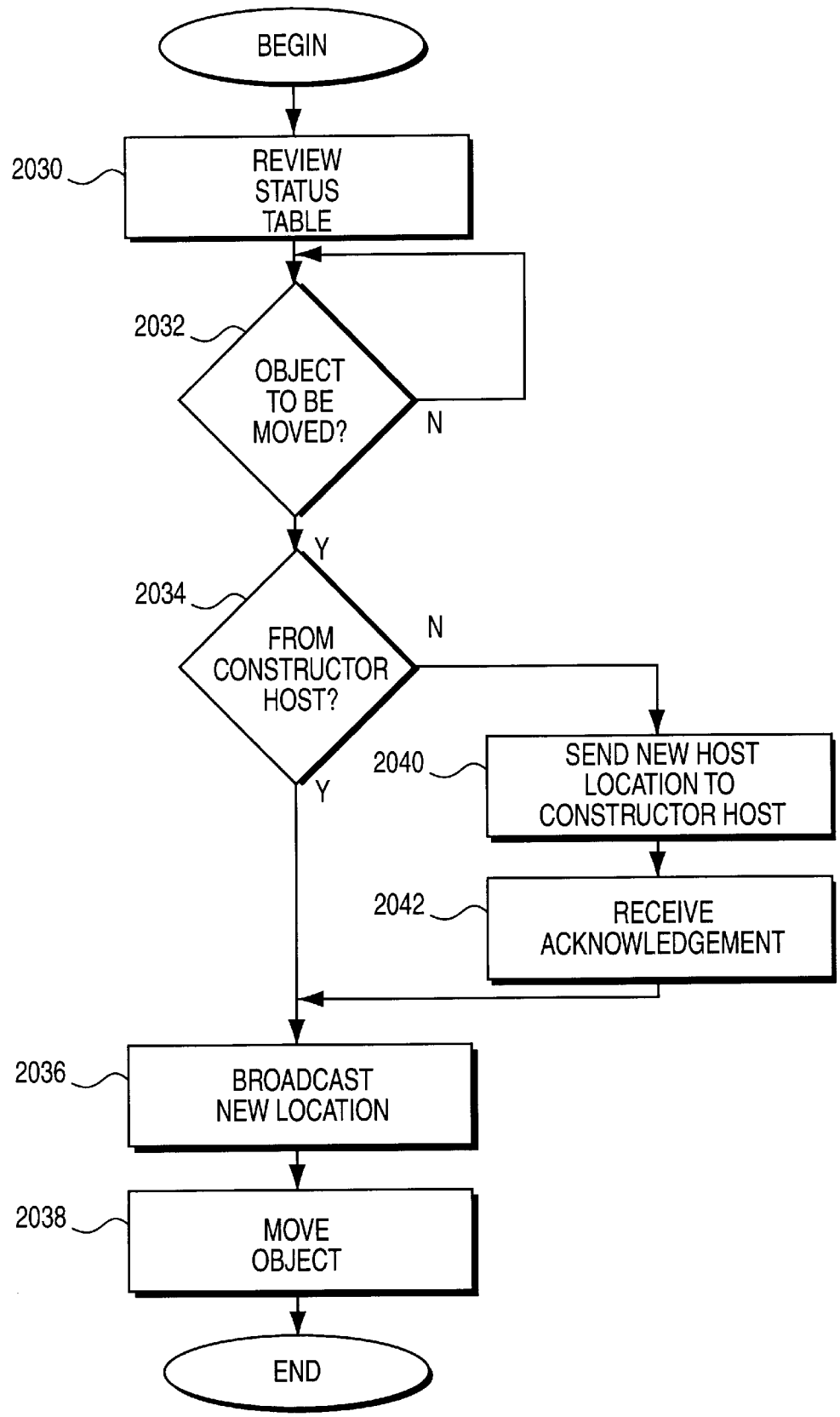
FIG. 23 is a flow diagram illustrating the process of moving an object from one host computer to another.

Referring to FIG. 23, objects need to permanently reside on a given host but may be moved from one host to another (i.e. deleted from the storage of one host and included in the storage memory of another).

In a step 2030, the object manager 108 for each host computer 10 reviews the status table 1500 thereof. In a step 2032, the object manager program 108 determines whether an object is to be moved from the host computer 10 on which the object manager 108 is resident; for example if that host computer 10 is running out of available memory. If so, a suitable object to move is selected (for example, a rarely accessed object).

In a step 2034, the object table 1500 is reviewed to determine, from the entry in the corresponding field 1530 for the object, whether the object is currently residing on the host on which it was created. If so, (i.e. if the object has not moved since it was created) then in a step 2036, a new host is selected (in exactly the same manner as described above in relation to creation of a new object) and in a step 2038, the object is moved.

Step 2038 comprises two components; firstly a message is transmitted to the new host instructing the creation of the object at that host and specifying the values of data stored within the object; and secondly, the object is deleted from memory on the current host computer 10.

If in step 2034 it is determined that the object is not currently resident on the host computer 10 on which it was created (i.e. the object has already moved since it was created), in a step 2040 the object manager sends a message with this new host location to the original host computer 10 on which the object was originally created (as determined from the entry 1530 and the table 1500 for the object) and, after receiving an acknowledgement from that original host computer in step 2042, proceeds as described above (step 2036).

Figure 24A:
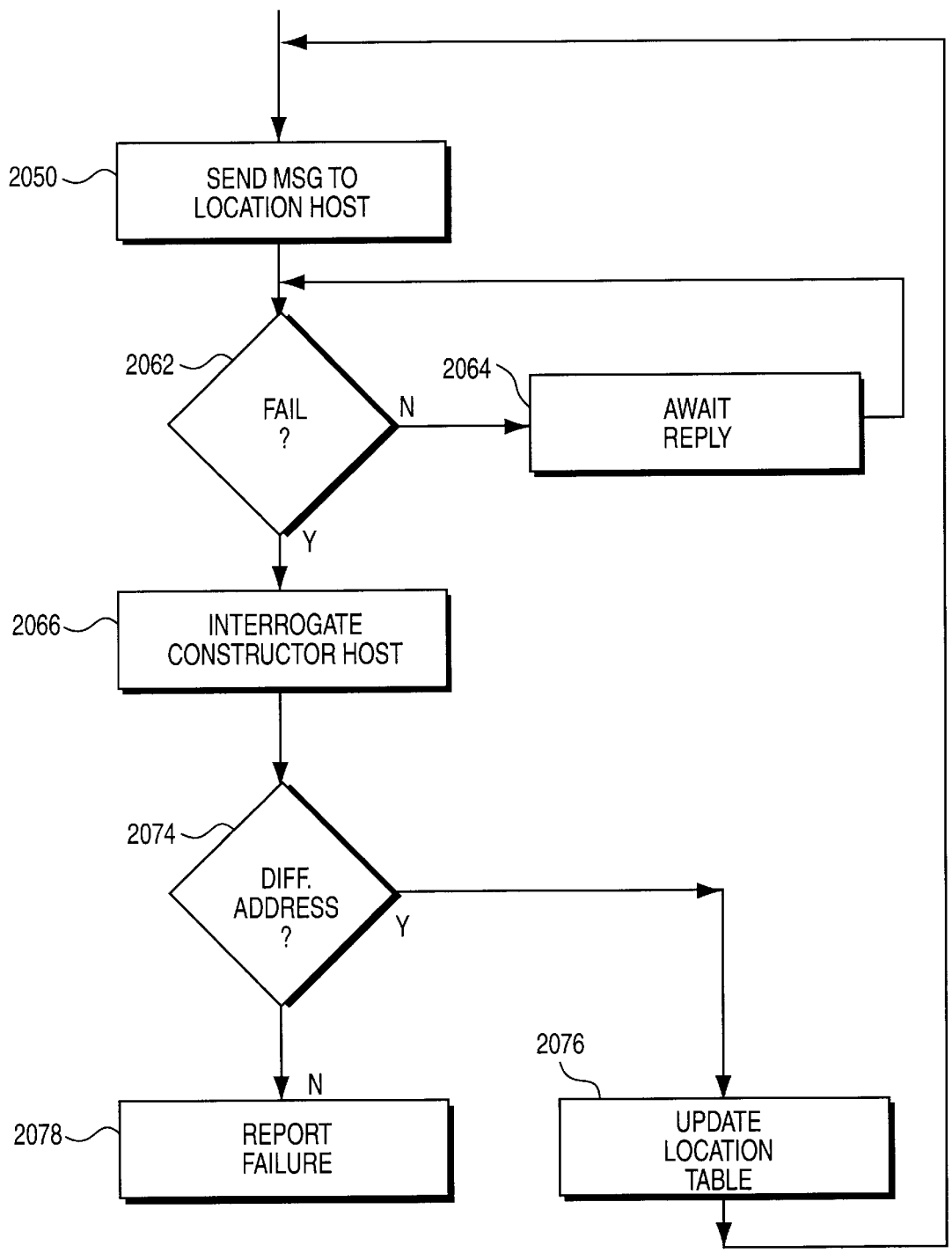
FIG. 24 (comprising FIGS. 24a, 24b and 24c) is a flow diagram showing the process of transmitting a message to an object on a remote host computer.
Figure 24B:
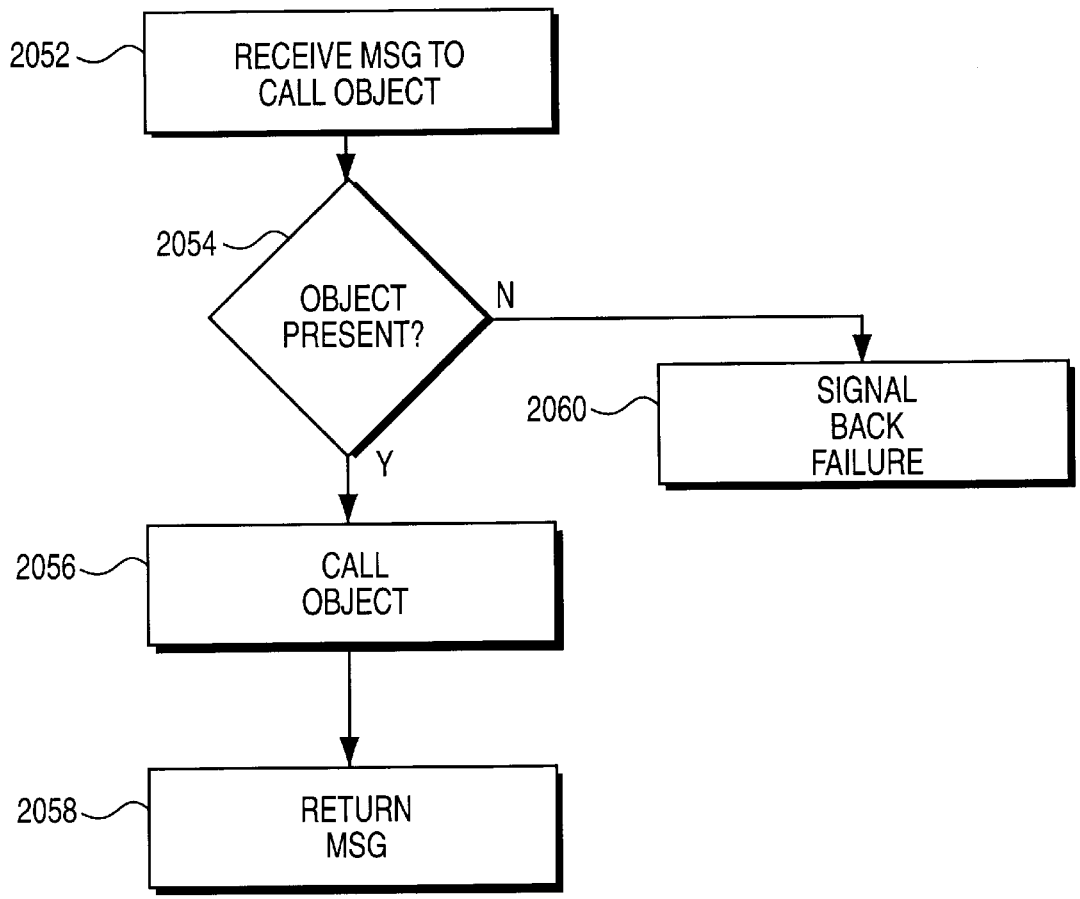
Figure 24C:
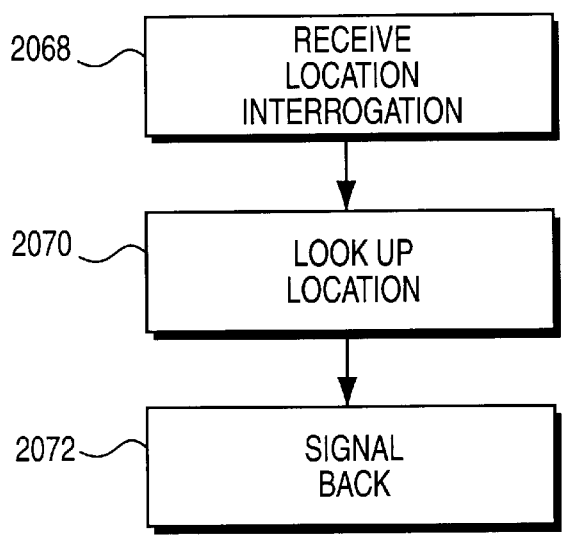

Referring to FIGS. 24a–24c, the use of the object location table 1500 will now be described in greater detail.

When a message is to be sent to an object, initially the object manager 108 determines the current host processor 10, on which the object is recorded as being located, within the object located table 1500, and sends a message, calling the object, to that current host in a step 2050.

In most instances, messages will reach the correct hosts, but it is possible that, due to interference during communications or some other cause, the object location table 1500 may not be completely up to date, so that the called object is not (or is no longer) on the indicated host computer.

Referring to FIG. 24b, when the host computer 10 to which the message is addressed receives the message in a step 2052, it determines whether or not the object is recorded as being present within its own object location table 1500 in a step 2054. If present, the object is called in a step 2056 and any return message is transmitted back in step 2058, as described above.

If not, then in a step 2060, the host computer signals back a failure to call the object.

The originating host computer, on receiving such a message in a step 2062, then sends an interrogation message to the original host computer 10 which is recorded in the table 1500 as being that on which the object in question was originally constructed, in a step 2066. Because of the separate location signalling steps 2040, 2042 of FIG. 23, the object location table 1500 on the original host on which the object was constructed should be fully up to date in respect of that object.

Referring to FIG. 24c, when the original host computer receives, in step 2068, a location interrogation signal the object manager 108 thereof refers to the object location table comprised within it in a step 2070, and signals back the determined location of the object concerned in a step 2072.

The first host computer receives the location signal from the original host and determines, in a step 2074 of FIG. 24a, whether the host computer thus indicated as the location of the object differs from that to which a message for the object has already been directed in step 2050. If so, the object manager 108 updates the location table 1500 in a step 2076, and returns to step 2050 to repeat transmission of the message to the newly indicated host computer 10 location for the object.

If the address received is the same as the address to which the message was previously directed, in a step 2078 the object manager program 108 returns a message indicating a failure to reach the object to the object, process or user from whence the attempt to call the object originated.

It will thus be seen that, in this embodiment, each host computer 10 carries an object location table in which the location of all objects in the system is recorded, and each host is therefore able to operate autonomously, without reference to the central database, to call other objects on different host computers. Nonetheless, a higher level of integrity is added by providing that each host computer 10 additionally keeps track of the locations of all objects which were originally created on that host computer, even if the location of those objects subsequently moves to a different host computer.

Furthermore, it will be apparent that each host computer 10 maintains accurate records of those objects which are located within its own storage area.

Other Embodiments and Modifications

It would, of course, be possible to provide separate tables for the objects stored locally within each host computer and for the objects originally created on that host computer, as well as those objects stored on other host computers. However, providing a single table storing all object locations ensures greater flexibility, since all object location tables 1500 of all host processors 10 will be substantially identical, making it possible in the event of the expansion of the distributed computing system to include a new host processor system to copy the object location table from any one host processor onto a new host processor.

It will be apparent from the foregoing that many modifications and substitutions are possible. For example, although, for the reasons above, it is convenient to provide the invention as a pre-compiler cooperating with a conventional C++ compiler, it would be equally be possible to integrate the present invention into an unconventional compiler (and indeed the combination of pre-compiler and compiler can be considered to comprise exactly this).

Naturally, the invention is usable not only with C++ but with other object oriented languages such as Smalltalk (TM) which are to be provided in a distributed environment. More generally, it would be possible to utilise equivalent techniques with a non object-oriented language and on a non-distributed system.

Whilst the invention has been described as including the compiler apparatus within a telecommunications system, it will be realised that in practice the compiler apparatus could be in a different jurisdiction and linked to the host computers via an international telecommunications network; accordingly, protection is claimed for the compiler apparatus both in combination with and in isolation from the telecommunications network with which it is used:

Naturally, applications other than telecommunications are possible, such as for example shared distributed computing.

Many other alternatives and modifications will be apparent to the skilled person. Accordingly, the present invention is intended to encompass any and all subject matter disclosed herein, whether or not covered by the accompanying claims.

Our other UK patent application UK application 9600823.0, filed on the same date and with the same title as this application) is usable with this invention and is incorporated by reference herein in its entirety. In particular, the functional information derived therein may be stored in the type model described herein.

What is claimed is:

1. A telecommunications system comprising:

a distributed control system including a plurality of interconnected computers and compiling apparatus for compiling programs for said computers, each of said interconnected computers including a memory space storing predetermined data records and programs for accessing said data record, the compiling apparatus including a compiler, possibly including first pre-processing tasks, arranged to compile an original source program for execution on a single host computer while being de-bugged and/or amended to produce an amended source program, and said compiling apparatus also including a compiler arranged to further compile the resulting amended source program using a pre-compiler which produces pre-compiled source code which, when compiled on a single host computer of said distributed control system, produces executable code suitable for execution in said distributed control system by a plurality of said distributed computers.

2. A system as in claim 1 in which said compiling apparatus is arranged to generate multiple copies of said compiled program, each of which is for execution on one of said interconnected computers.

3. Apparatus as in claim 1 in which said original source program is in an object oriented language.

4. Apparatus as in claim 3 in which said language is C++ or a variant thereof.

5. A system as in claim 1 wherein:

each of said interconnected computers includes a table of the location of all data records on all said interconnected computers.

6. A system as in claim 5 in which the data records may be moved from a first computer to a second computer.

7. A system as in claims 6, in which, on such a move, the computer on which a record will be relocated is signalled to each other computer.

8. A system as in claim 6, in which each said location table stores also the location of the computer on which the data record was created.

9. A system as in claim 8, in which, to access a data record, each of said computers is arranged to read the location table it stores and then, if necessary, to access the location table of the computer on which the data record was created.

10. A system as in claim 5 in which said data records comprise objects each accessible only via associated code class.

11. A system as in claim 10 in which said objects comprise multiple objects of the same class, and in which multiple objects of said class share said associated class code.

12. A compiler apparatus for use with a distributed control system including a plurality of interconnected computers, each of said interconnected computers including a memory space storing predetermined data records and programs for accessing said data records, said compiler apparatus being arranged to accept an original source program in a source language, suitable for compilation on a single computer, and the compiler apparatus including a compiler arranged to compile the original source program in said source language, and a pre-compiler arranged, thereafter, to modified thus-compiled original source program for execution by a plurality of said interconnected computers.

13. A compiler apparatus for use with a distributed control system including a plurality of interconnected computers, said compiler apparatus being arranged to accept an original source program in a source language, suitable for compilation on a single computer, and said compiler apparatus being arranged to accept said original source code program and to locate, within said original source program, functions which may be invoked from other computers of said interconnected computers, and to adapt said original source program with invoker code and referencing code to permit said functions to be invoked remotely from other computers of said interconnected computers.

14. A compiler apparatus for use with a distributed control system including a plurality of interconnected computers, said compiler apparatus being arranged to accept an original source program in a source language, suitable for compilation and execution on a single computer, and the compiler apparatus being arranged to locate, within said original source program, references which will be compiled by the compiler as pointers to areas within said single computer is memory space, and to amend said original source program so as to be capable of referring said memory spaces to other computers of said interconnected computers.

15. A compiler apparatus for use with a distributed control system including a plurality of interconnected computers, said compiler apparatus being arranged to accept an original source program in a source language, suitable for compilation and execution on a single computer, and said compiler apparatus being arranged to read said original source program and to add thereto a set of predetermined data records describing the data and program structures included within said original source program so as to thereafter be suitable for coordinated execution within a plurality of said interconnected computers.

16. A method of compiling a computer program for a telecommunications system comprising: a distributed control system including a plurality of interconnected computers and compiling apparatus for compiling programs for said computers, each of said interconnected computers including a memory space storing predetermined data records and programs for accessing said data records, said method comprising the steps of:

compiling a source program for execution on a single-computer itself, and thereafter amending said source program to add additional source code whereby to produce an amended source program for, when compiled, within said single-computer permits execution in said distributed control system by a plurality of said interconnected computers.

17. A method as in claim 16 wherein compiling of said amended source program includes generating multiple copies of said compiled program, each of which is for execution on one of said interconnected computers.

18. A method of compiling a computer program for use with a distributed control system including a plurality of interconnected computers, each of said interconnected computers including a memory space storing predetermined data records and programs for accessing said data records, said method comprising the steps of:

compiling an original source program for execution on a single computer itself, and again compiling, within said single computer, said original source program after its modification for permitting execution in said distributed control system by a plurality of said interconnected computers.

19. A method of compiling a computer program for use with a distributed control system including a plurality of interconnected computers, said method comprising:

generating an original source program in a source language suitable for compilation on a single computer itself, locating within said original source program, functions which may be invoked from other computers of said interconnected computers, and adapting said original source program within said single computer, by adding invoker code and referencing code permitting said functions to be invoked remotely from other computers of said interconnected computers.

20. A method of compiling a computer program for use with a distributed control system including a plurality of interconnected computers, said method comprising:

generating an original source program in a source language, suitable for compilation and execution on a single computer itself, locating within said original source program, references which will be compiled by the compiler as pointers to areas within said single computer is memory space, and amending said original source program, within said single computer so as to be capable of referring said memory spaces to other computers of said interconnected computers.

21. A method of compiling a computer program for use with a distributed control system including a plurality of interconnected computers, said method comprising:

generating an original source program in a source language, suitable for compilation and execution on a single computer itself, and adding to said original source program, within said single computer a set of predetermined data records describing the data and program structures included within said original source program so as to thereafter be suitable for coordinated execution within a plurality of said interconnected computers.

* * * * *